US007340232B2

(12) United States Patent
Murakami et al.

(10) Patent No.: US 7,340,232 B2
(45) Date of Patent: Mar. 4, 2008

(54) RECEIVING SYSTEM AND SEMICONDUCTOR INTEGRATED CIRCUIT DEVICE FOR PROCESSING WIRELESS COMMUNICATION SIGNAL

(75) Inventors: Motoki Murakami, Yokohama (JP); Yutaka Igarashi, Yokohama (JP); Akio Yamamoto, Hiratsuka (JP); Isao Ikuta, Yokohama (JP); Yoshiaki Harasawa, Ogo (JP)

(73) Assignee: Renesas Technology Corp., Tokyo (JP)

( * ) Notice: Subject to any disclaimer, the term of this patent is extended or adjusted under 35 U.S.C. 154(b) by 415 days.

(21) Appl. No.: 10/842,445

(22) Filed: May 11, 2004

(65) Prior Publication Data

US 2005/0118976 A1 Jun. 2, 2005

(30) Foreign Application Priority Data

Dec. 2, 2003 (JP) ............................. 2003-402559

(51) Int. Cl.
*H04B 1/16* (2006.01)
(52) U.S. Cl. ...................... 455/209; 455/304; 455/324
(58) Field of Classification Search ............... 455/208, 455/209, 303, 304, 305, 306, 324
See application file for complete search history.

(56) References Cited

U.S. PATENT DOCUMENTS 7,107,036 B1* 9/2006 Gehring ...................... 455/334

7,116,953 B2* 10/2006 Kim et al. ................... 455/147
2002/0081990 A1* 6/2002 Asikainen et al. .......... 455/324

FOREIGN PATENT DOCUMENTS

JP 11-055342 2/1999

OTHER PUBLICATIONS

A. Parssinen, "Direct Conversion Receivers in Wide-Band Systems", Kluwer Academic Publishers.

* cited by examiner

*Primary Examiner*—Edward F. Urban
*Assistant Examiner*—Christian A. Hannon
(74) *Attorney, Agent, or Firm*—Mattingly, Stanger, Malur & Brundidge, PC

(57) ABSTRACT

The invention provides a receiving system and a transmitting system capable of decreasing an offset between differential signals and between quadrature signals and improving a manufacturing yield and a semiconductor integrated circuit device for processing a wireless communication signal having therein the systems. A receiving system includes: a local oscillator for generating an oscillation signal in a desired frequency; a 90-degree phase-shifting circuit for generating a signal by shifting a phase of the oscillation signal output from the local oscillator by 90 degrees; a first mixer for mixing one of differential reception signals with an output signal of the first 90-degree phase-shifting circuit and outputting frequency-converted differential signals; and a second mixer for mixing another one of the differential reception signals with an output signal of the local oscillator and outputting frequency-converted differential signals.

1 Claim, 15 Drawing Sheets

RECEIVING SYSTEM AND SEMICONDUCTOR INTEGRATED CIRCUIT DEVICE FOR PROCESSING WIRELESS COMMUNICATION SIGNAL

CROSS-REFERENCE TO RELATED APPLICATION

The present application claims priority from Japanese applications JP 2003-402559 filed on Dec. 2, 2003 and JP 2003-113098 filed on Apr. 17, 2003, the contents of which are hereby incorporated by reference into this application.

BACKGROUND OF THE INVENTION

The present invention relates to a receiving system as a component of a wireless communication system and a semiconductor integrated circuit device for processing a wireless communication signal, having therein a receiving circuit and a transmitting circuit. More particularly, the invention relates to a receiving system having a quadrature mixer for performing frequency conversion on a signal by using two local signals having the same frequency but whose phases are different from each other by 90 degrees and to a semiconductor integrated circuit device for processing a wireless communication signal.

Hitherto, a wireless communication signal processing circuit is constructed by using separate parts for each of function blocks (an amplifier for amplifying a signal, a mixer for converting the frequency of a signal, a filter for passing only a desired band in a signal, and the like). Because of improvement in the semiconductor technique in recent years, a plurality of function blocks constructing the wireless communication signal processing circuit can be provided in one semiconductor chip. The wireless communication signal processing circuit built in one or a plurality of semiconductor chips converts a radio frequency signal received from an antenna to a lower frequency signal of high qualities (low noise, high linearity, suppression of signals in bands other than the desired band, and the like). There is also an IC for processing a wireless communication signal, in which a transmitting circuit for converting a signal supplied from a baseband part to a signal of a higher frequency band is provided together with a receiving circuit in a single semiconductor chip.

To realize the wireless communication signal processing circuit device at low cost, a larger number of function blocks constructing the wireless communication signal processing circuit have to be provided in a single semiconductor chip. One of problems against the object is that a filter circuit for suppressing signals in bands other than the desired band has to be provided in the semiconductor chip. Generally, as the filter circuit, an SAW (Surface Acoustic Wave) filter, a dielectric filter, and the like is used. By such a filter, signals existing in bands other than the desired band are suppressed. However, the SAW filter and the dielectric filter cannot be provided in a semiconductor chip.

The wireless communication signal processing circuit device in an individual part generally has a configuration called a superheterodyne configuration and needs an SAW filter or dielectric filter. However, such a filter cannot be provided in the semiconductor chip. Consequently, when a wireless communication signal processing circuit device manufactured of semiconductor is constructed as a superheterodyne device, an SAW filter or a dielectric filter has to be provided on the outside of the semiconductor chip. It increases the number of parts and the mounting area.

A wireless communication signal processing circuit device has also been proposed, which does not require an SAW filter or a dielectric filter by using the advantage of a semiconductor circuit such that although absolute values of constants of parts of semiconductor chips vary, the absolute values of constants of parts of a single semiconductor chip match each other with high precision. This method includes a zero-IF method and a low IF method. None of the methods requires an external SAW filter or a dielectric filter and suppresses signals existing in bands other than the desired band by using a filter which can be provided in the semiconductor chip. It may be necessary to externally provide a part of filters depending on a wireless communication method or a requirement from the viewpoint of the system.

The radical principles of the zero-IF method, low IF method, and the like are described in, for example, Non-patent Reference 1. The zero-IF method and the low IF method have a common operational characteristic such that a signal is decomposed to two components of an I component and a Q component, and the two components are processed. By inputting two local oscillation signals having the same frequency and having phases different from each other by 90 degrees and a signal to be decomposed to the I component and the Q component to a quadrature mixer, the signals are decomposed to the I and Q components.

To explain the operation, FIG. 6 shows a basic configuration of a zero-IF wireless communication signal receiving system. Shown in FIG. 6 are an antenna input terminal 1, a band pass filter (hereinbelow, abbreviated as "BPF") 2, a low noise amplifier (hereinbelow, referred to as "LNA") 3, quadrature mixers 4I and 4Q, low pass filters (hereinbelow, abbreviated as "LPFs") 5I and 5Q, amplifiers 6I and 6Q, a 90-degree phase-shifting circuit 7, a local oscillator 8, and output terminals 9I1, 9I2, 9Q1 and 9Q2. Each of the blocks 2, 3, 4I, 4Q, 5I, 5Q, 6I, and 6Q has a differential configuration and the reference numerals with subscripts o and oB 2o, 2oB, 3o, 3oB, 4Io, 4IoB, 4Qo, 4QoB, 5Io, 5IoB, 5Qo, 5QoB, 6Io, 6IoB, 6Qo, and 6QoB denote output signals from terminals. Each of the terminals outputs output signals whose phases are different from each other by 180 degrees.

A wireless communication signal input from the antenna input terminal 1 is supplied to the BPF 2 where signals in bands other than a desired band are suppressed, and the resultant signal is input as a balanced signal to the LNA 3. The LNA 3 amplifies an output signal of the BPF 2 so as not to degrade the signal-to-noise ratio (hereinbelow, abbreviated as "SNR") as much as possible. An output signal of the LNA 3 is equally divided into two signals and the signals are input to the quadrature mixers 4I and 4Q. An output signal of the local oscillator 8 is subjected to 90-degree phase shifting by the 90-degree phase shifting circuit 7 and the resultant is input as a local oscillation signal to the quadrature mixer 4I. To the quadrature mixer 4Q, an output signal of the local oscillator 8 is input as a local oscillation signal without being subjected to phase shifting. At this time, the frequency of an output signal of the local oscillator 8 coincides with the center frequency of a signal in a desired channel of a wireless communication signal input from the antenna input terminal 1.

Therefore, an output signal of the quadrature mixer 4I becomes an I component of a signal in a desired band of the wireless communication signal input from the antenna input terminal 1, and an output signal of the quadrature mixer 4Q becomes a Q component of a signal in a desired band of the wireless communication signal input from the antenna input terminal 1. Output signals of the quadrature mixers 4I and 4Q are called normal-band signals in the zero-IF method.

The LPFs 5I and 5Q function as channel selecting filters and suppress bands other than the band of the desired channel signal. Output signals of the LPFs 5I and 5Q are amplified to a desired level by the amplifiers 6I and 6Q, and the amplified signals are output from the output terminals 9I1, 9I2, 9Q1 and 9Q2.

The output signal o from each of the blocks having the differential configuration includes an opposite phase component having a phase different from that of the output signal oB by 180 degrees and also includes the in-phase signal components having the same phase. Therefore, when the in-phase signal components of the output signals o and oB are not the same, an offset occurs. When the offset is large and exceeds a dynamic range of a block at a post stage, the opposite-phase signal components of the output signals o and oB as desired signal components cannot be processed.

To reduce the offset, the in-phase signal components in the output signals o and oB are averaged. FIG. 7 shows an example of the configuration of the zero-IF wireless communication signal receiving circuit to explain the above. In FIG. 7, 10I and 10Q denote in-phase signal component averaging circuits. In FIG. 7, the same reference numerals as those of FIG. 6 are given to components performing operations similar to those of FIG. 6 and their description will not be repeated here. The in-phase signal component averaging circuit 10I averages the in-phase signal components in the output signals 4Io and 4IoB of the quadrature mixer 4I to reduce the offset of the quadrature mixer 4I. The in-phase signal component averaging circuit 10Q averages the in-phase signal components in the output signals 4Qo and 4QoB of the quadrature mixer 4Q and reduces the offset of the quadrature mixer 4Q.

The in-phase signal component averaging circuits 10I and 10Q are constructed, for example, as shown in FIG. 8. In FIG. 8, the same reference numerals as those of FIG. 6 are given to components performing operations similar to those of FIG. 6 and their description will not be repeated here. 11I and 11Q denote passive elements. The passive elements 11I and 11Q have an equal impedance. In the case where the in-phase signal component of the output signal 4IoB of the quadrature mixer 4I is larger than that of the output signal 4Io, correction current passing through the passive element 11I flows from 4Io to 4IoB, and an offset of the quadrature mixer 4I is reduced. In the case where the in-phase signal component of the output signal 4QoB is larger than that of the output signal 4Qo of the quadrature mixer 4Q, correction current passing through the passive element 11Q flows from 4Qo to 4QoB, and the offset of the quadrature mixer 4Q is reduced. The passive elements 11I and 11Q suppress both the in-phase components and the opposite phase components of signal components out of the desired channel bands of the output signals 4Io, 4IoB, 4Qo, and 4QoB.

In the receiving system of FIG. 8, an offset is reduced by the passive elements 11I and 11Q. However, due to variations in characteristics of elements constructing the circuit, even when the passive elements 11I and 11Q are used, a large offset which cannot satisfy the specifications may occur. When the offset of the quadrature mixer 4I satisfies the specifications but the offset of the quadrature mixer 4Q does not satisfy the specifications or vice versa, the wireless communication signal receiving circuit is defective and the manufacturing yield deteriorates. When the impedances of the passive elements 11I and 11Q are reduced, an offset also decreases. However, the opposite phase component of a desires signal in a desired channel band also attenuates and the SNR deteriorates. Although elimination of an offset by a digital process is proposed in Patent Reference 1, it cannot be realized at low cost for reasons like the circuit cannot be provided in a semiconductor chip.

Although the problems in the receiving system have been described above, in a manner similar to the receiving system, a transmitting system is also provided with a frequency converter for inputting a signal to be transmitted and a local oscillator to a quadrature mixer, converting a signal to a signal of a higher frequency, and outputting the resultant signal. Consequently, also in the quadrature mixer on the transmission side, there is a problem that a DC offset occurs between differential output signals due to variations in the characteristics of elements of the circuit.

Further, the transmitting system has an amplifier for amplifying a signal to be transmitted on the ante stage of the quadrature mixer. When a DC offset occurs in output signals of the amplifier due to variations in the characteristics of the elements of the amplifier, a carrier leak occurs in which in addition to a desired frequency, a frequency component which is the same as that of a carrier wave appears in an output of the quadrature mixer, and the yield deteriorates.

When the wireless communication system using the transmitting system is a portable telephone of GSM (Global System for Mobile Communication) in which transmission and reception are performed separately, it is possible to provide an amplifier with a circuit for compensating for a DC offset in output signals, measure a DC offset of the amplifier during reception, and compensate for the offset. In the case of a portable telephone of the CDMA (Code Division Multiple Access) for performing transmission and reception concurrently, there is no time allowance for performing measurement and compensation for a DC offset. Consequently, there is a problem such that a DC offset occurs due to characteristic variations in elements constructing the circuit.

[Patent Reference 1]
Japanese Unexamined Patent Publication No. 11(1999)-55342

[Non-patent Reference 1]
"Direct Conversion Receivers in Wide-Band Systems" by Aarno Parssinen, Kluwer Academic Publishers

SUMMARY OF THE INVENTION

The invention is to solve the above-described problems and its object is to provide a receiving system and a semiconductor integrated circuit device for processing a wireless communication signal capable of decreasing an offset between differential signals and between quadrature signals and improving a manufacturing yield.

The above and other objects and novel features of the invention will become apparent from the description of the specification and the appended drawings.

The invention provides a receiving system having a zero-IF signal selection and amplification unit comprising: an antenna input filter for passing only a desired band in a signal from an antenna input terminal; an antenna input amplifier for amplifying an output signal of the antenna input filter and outputting the amplified signal; a dividing circuit for dividing an output signal of the antenna input amplifier into two signals; a local oscillator for outputting a signal which oscillates at a center frequency of a desired channel band in an output signal of the antenna input filter; a 90-degree phase-shifting circuit for shifting a phase of an output signal of the local oscillator by 90 degrees and outputting a resultant signal; a first mixer for mixing a first output signal of the dividing circuit with the output signal of the first 90-degree phase-shifting circuit; a second mixer for mixing a second output signal of the dividing circuit with the output signal of the local oscillator; a first mixer filter connected to the first mixer and for passing only a desired channel band of an input signal; a second mixer filter connected to the second mixer and for passing only a desired channel band of the input signal; a first filter output amplifier connected to the first mixer filter and for amplifying an input signal and outputting the amplified signal; and a second filter output amplifier connected to the second mixer filter and for amplifying an input signal and outputting the amplified signal, wherein the zero-IF signal selection and amplification unit adjusts an output signal from the first mixer and an output signal from the second mixer by an in-phase signal component of the output signal from the second mixer or the output signal from the first mixer.

In the receiving system according to the invention, the zero-IF signal selection and amplification unit has a circuit for connecting the first mixer with the first mixer filter, connecting the second mixer with the second mixer filter and averaging in-phase signal components in the output signal of the first mixer and the output signal of the second mixer.

In the receiving system according to the invention, the zero-IF signal selection and amplification unit has a circuit for connecting the first mixer filter with the first filter output amplifier, connecting the second mixer filter with the second filter output amplifier and averaging in-phase signal components in an output signal of the first mixer filter and an output signal of the second mixer filter.

Further, in the receiving system according to the invention, the zero-IF signal selection and amplification unit has a circuit for connecting a post stage of the first filter output amplifier with a post stage of the second filter output amplifier and averaging in-phase signal components in an output signal of the first filter output amplifier and an output signal of the second filter output amplifier.

In the receiving system according to the invention, the zero-IF signal selection and amplification unit has passive elements having equal impedances and a bridging line and adds a correction current to the output signal.

The invention also provides a receiving system having a low-IF signal selection and amplification unit comprising: an antenna input filter for passing only a desired band in a signal from an antenna input terminal; an antenna input amplifier for amplifying an output signal of the antenna input filter and outputting the amplified signal; a dividing circuit for dividing an output signal of the antenna input amplifier into two signals; a local oscillator for outputting a signal which oscillates at a frequency apart from a center frequency of a desired channel band in an output signal of the antenna input filter by ½ of the desired channel bandwidth or more; a first 90-degree phase-shifting circuit for shifting a phase of an output signal of the local oscillator by 90 degrees and outputting a resultant signal; a first mixer for mixing a first output signal of the dividing circuit with the output signal of the first 90-degree phase-shifting circuit; a second mixer for mixing a second output signal of the dividing circuit with the output signal of the local oscillator; a first mixer filter connected to the first mixer and for passing only a desired channel band of an input signal; a second mixer filter connected to the second mixer and for passing only a desired channel band of the input signal; a first filter output amplifier connected to the first mixer filter and for amplifying an input signal and outputting the amplified signal; a second filter output amplifier connected to the second mixer filter and for amplifying an input signal and outputting the amplified signal; a second 90-degree phase-shifting circuit for shifting a phase of an output signal of the second filter output amplifier by 90 degrees; and an adder for adding an output signal of the first filter output amplifier to an output signal of the second 90-degree phase-shifting circuit, wherein the low IF signal selection and amplification unit adjusts each of an output signal from the first mixer and an output signal from the second mixer by an in-phase signal component of the output signal from the second mixer or the output signal from the first mixer.

In the receiving system according to the invention, the low-IF signal selection and amplification unit has a circuit for connecting the first mixer with the first mixer filter, connecting the second mixer with the second mixer filter and averaging in-phase signal components in the output signal of the first mixer and the output signal of the second mixer.

In the receiving system according to the invention, the low-IF signal selection and amplification unit has a circuit for connecting the first mixer filter with the first filter output amplifier, connecting the second mixer filter with the second filter output amplifier and averaging in-phase signal components in an output signal of the first mixer filter and an output signal of the second mixer filter.

In the receiving system according to the invention, the low-IF signal selection and amplification unit has a circuit for connecting a post stage of the first filter output amplifier with a post stage of the second filter output amplifier and averaging in-phase signal components in an output signal of the first filter output amplifier and an output signal of the second filter output amplifier.

Further, in the receiving system according to the invention, the low-IF signal selection and amplification unit has passive elements having equal impedances and a bridging line and adds a correction current to the output signal.

According to a second aspect of the invention, there is provided a semiconductor integrated circuit device for processing a wireless communication signal, having therein a transmitting circuit comprising: a first differential amplifier for amplifying first differential transmission signals; a second differential amplifier for amplifying a second differential transmission signal having a phase different from that of the first transmission signal by 90 degrees; a local oscillator for generating an oscillation signal of a desired frequency; a 90-degree phase-shifting circuit for generating a signal obtained by shifting a phase of the oscillation signal output from the local oscillator by 90 degrees; a first mixer for mixing the first transmission signal with an output signal of the 90-degree phase-shifting circuit and outputting frequency-converted differential signals; and a second mixer for mixing the second transmission signal with the output signal of the local oscillator and outputting frequency-converted differential signals, wherein an in-phase signal component averaging circuit is provided, which has passive elements connected between differential outputs of the first differential amplifier, between differential outputs of the second differential amplifier, and between an output of the first differential amplifier and an output of the second differential amplifier, and reduces a DC offset created due to a difference between in-phase signal components included in output signals of the first and second differential amplifiers.

Effects obtained by a representative one of inventions disclosed in the specification will be briefly described as follows.

According to the invention, the receiving system and the semiconductor integrated circuit device for processing a wireless communication signal, capable of decreasing an offset between differential signals and between quadrature signals based on the difference between in-phase signal components in differential signals and quadrature signals and improving the manufacturing yield can be obtained.

DETAILED DESCRIPTION OF THE PREFERRED EMBODIMENTS

Embodiments of the invention will be described hereinbelow.

An embodiment of a receiving system of the invention will be described with reference to FIGS. 1 to 5.

Figure 1:
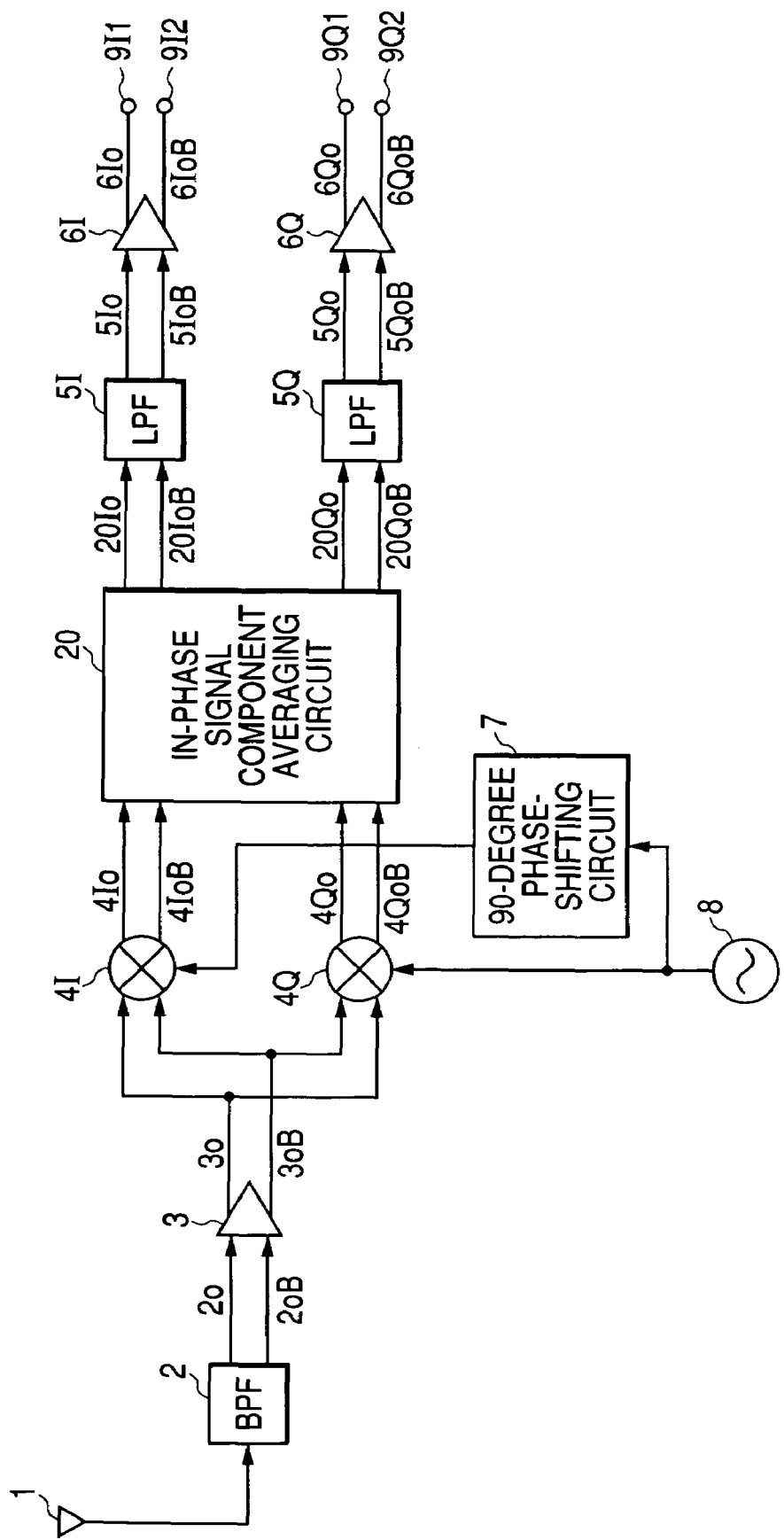
FIG. 1 is a block diagram of a zero-IF selection and amplification unit in a receiving system of a first embodiment.
Figure 2:
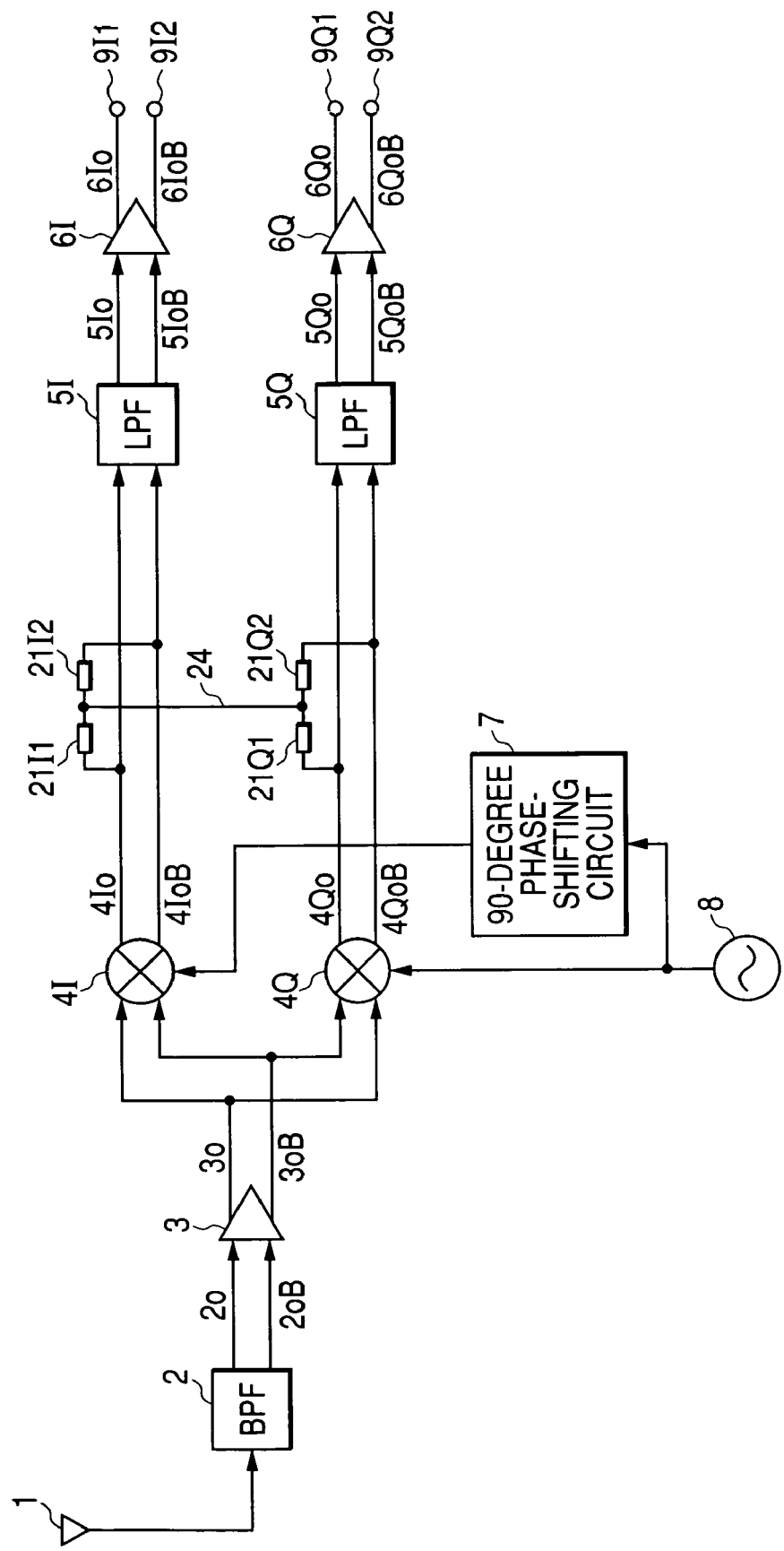
FIG. 2 is a block diagram showing a first concrete example of in-phase signal component averaging means in the receiving system of the first embodiment.
Figure 3:
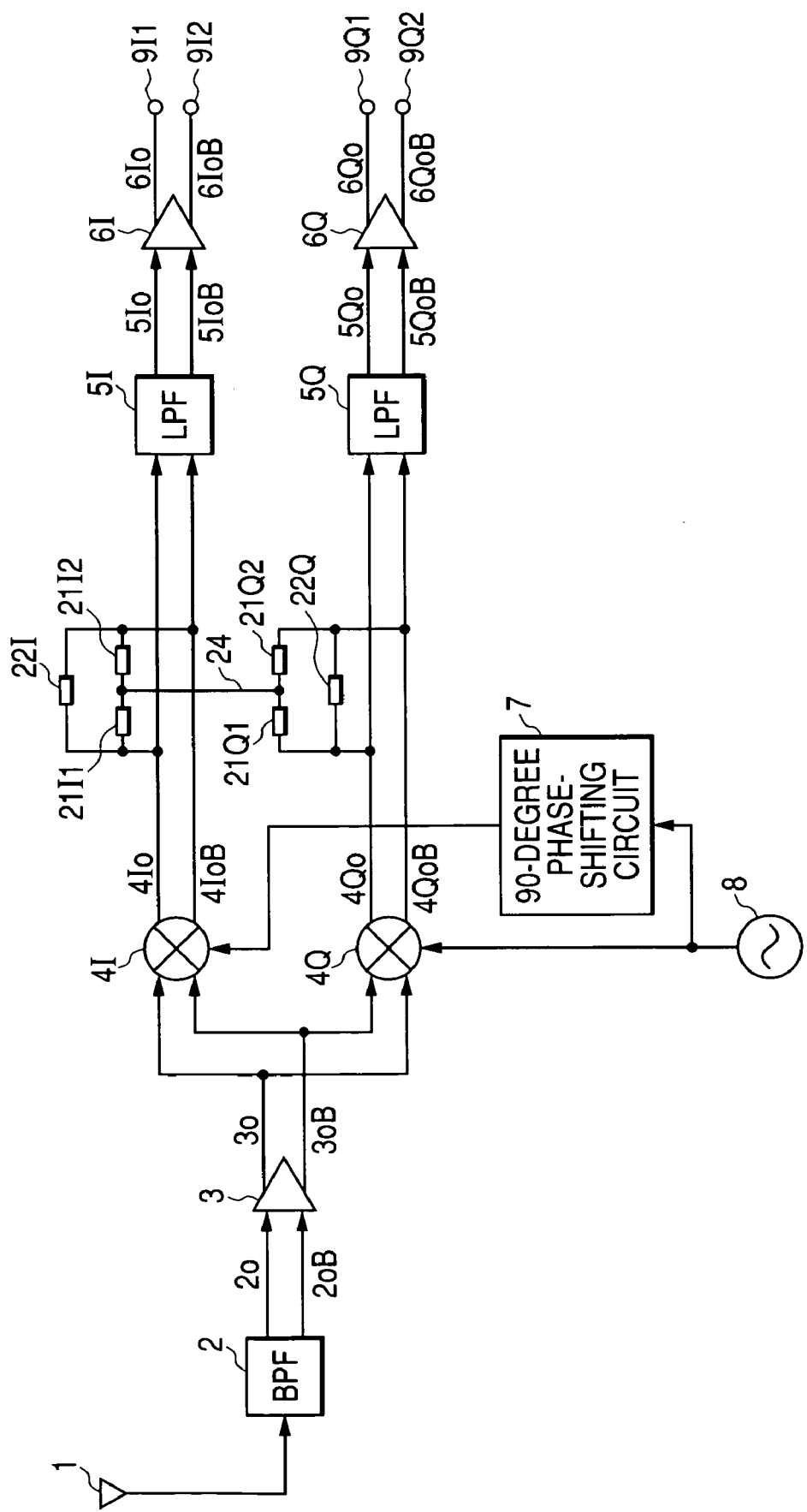
FIG. 3 is a block diagram showing a second concrete example of the in-phase signal component averaging means in the receiving system of the first embodiment.
Figure 4:
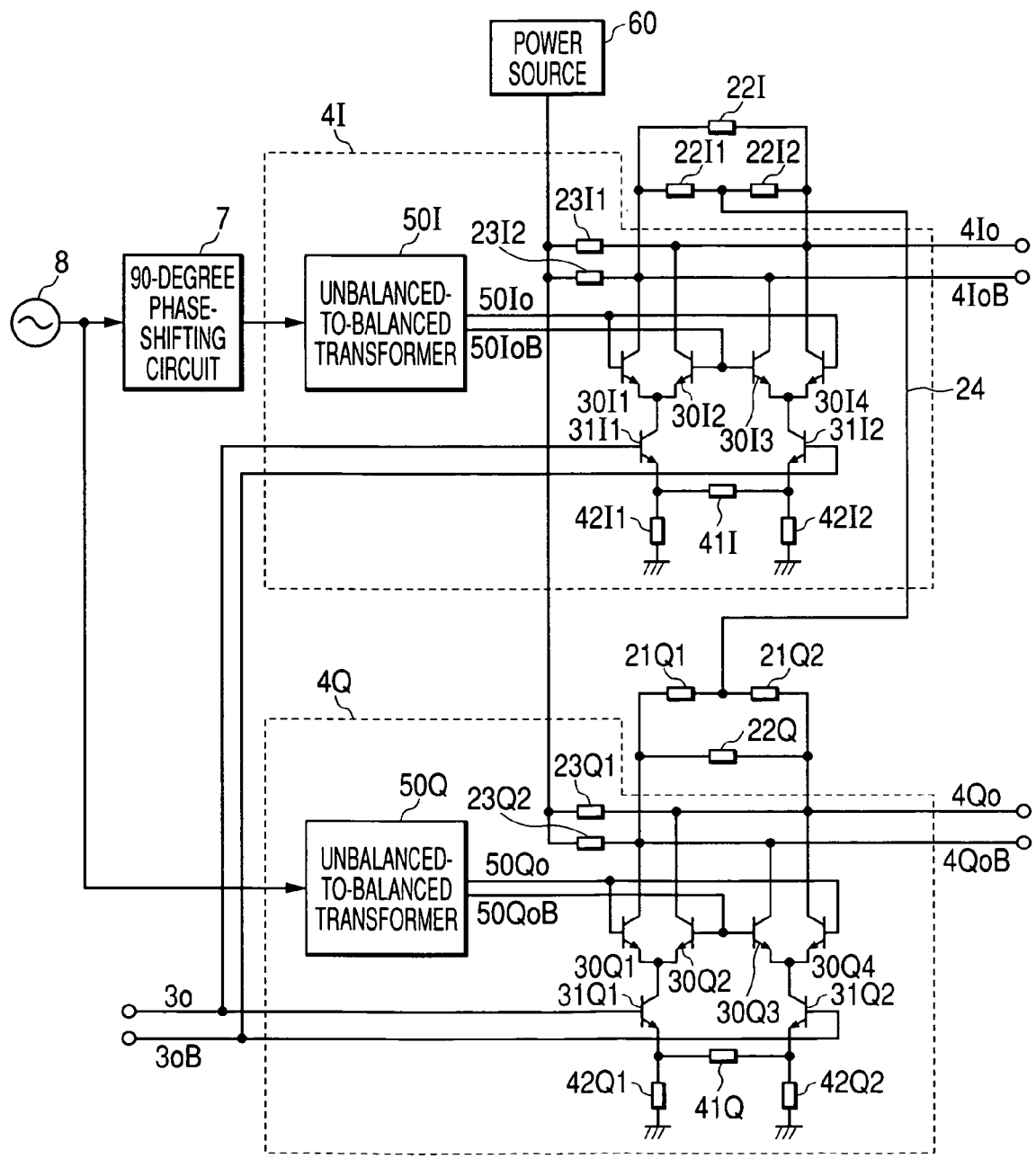
FIG. 4 is a diagram illustrating a second concrete example of a quadrature mixer in the receiving system of the first embodiment.
Figure 5:
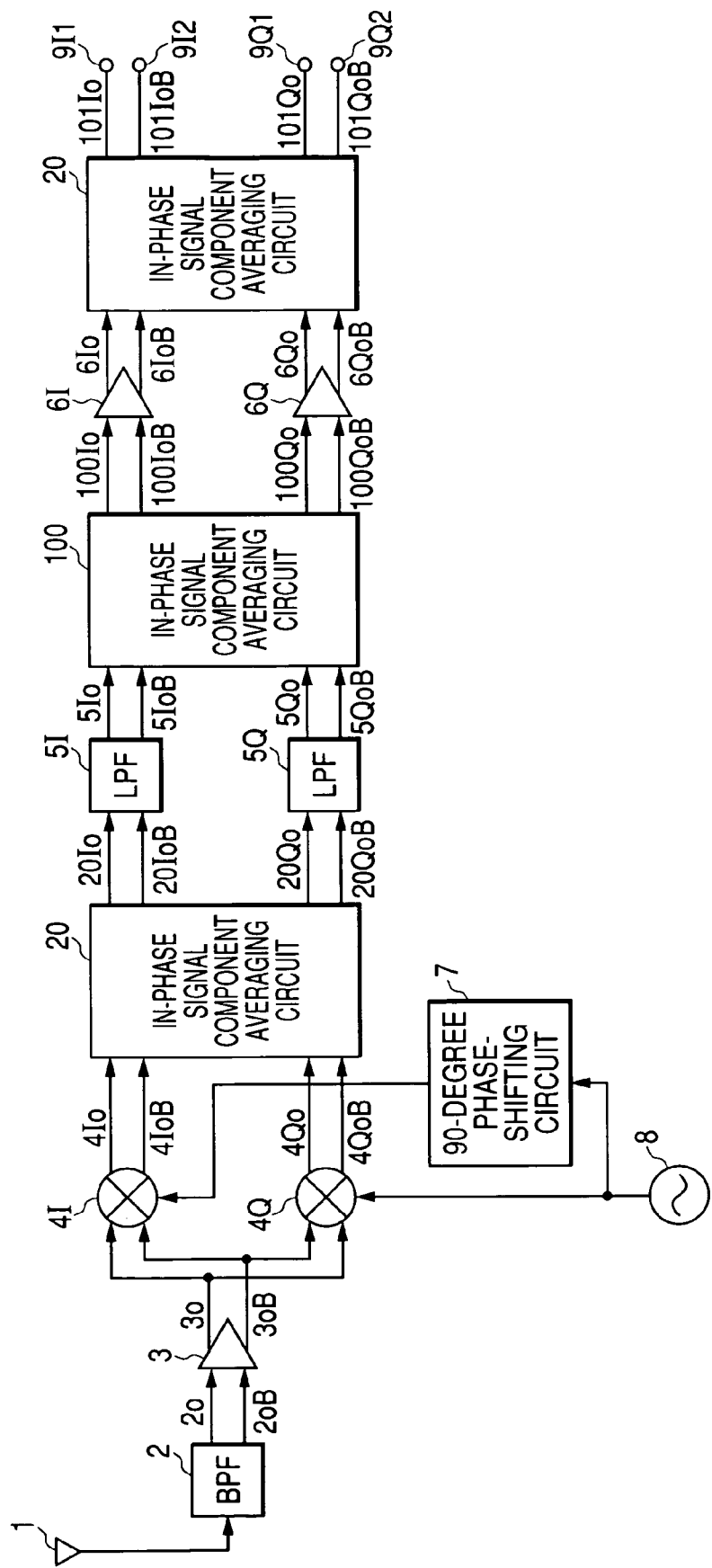
FIG. 5 is a block diagram showing a receiving system of a second embodiment.

FIG. 1 is a block diagram of a zero-IF selection and amplification unit in a receiving system of a first embodiment. FIG. 2 is a block diagram showing a first concrete example of in-phase signal component averaging means in the receiving system of the first embodiment. FIG. 3 is a block diagram showing a second concrete example of the in-phase signal component averaging means in the receiving system of the first embodiment. FIG. 4 is a diagram illustrating a second concrete example of a quadrature mixer in the receiving system of the first embodiment. FIG. 5 is a block diagram showing a receiving system of a second embodiment.

A first embodiment will be described. The receiving system of the embodiment has a zero-IF signal selection and amplification unit including: an antenna input filter for passing only a desired band in a signal from an antenna input terminal; an antenna input amplifier for amplifying an output signal of the antenna input filter and outputting the amplified signal; a dividing circuit for dividing an output signal of the antenna input amplifier into two signals; a local oscillator for outputting a signal which oscillates at a center frequency of a desired channel band in an output signal of the antenna input filter; a 90-degree phase-shifting circuit for shifting a phase of an output signal of the local oscillator by 90 degrees and outputting a resultant signal; a first mixer for mixing a first output signal of the dividing circuit with the output signal of the 90-degree phase-shifting circuit; a second mixer for mixing a second output signal of the dividing circuit with the output signal of the local oscillator; a first mixer filter connected to the first mixer and for passing only a desired channel band of an input signal; a second mixer filter connected to the second mixer and for passing only a desired channel band of the input signal; a first filter output amplifier connected to the first mixer filter and for amplifying an input signal and outputting the amplified signal; and a second filter output amplifier connected to the second mixer filter and for amplifying an input signal and outputting the amplified signal. The zero-IF signal selection and amplification unit can adjust an output signal from the first mixer and an output signal from the second mixer by an in-phase signal component of the output signal from the second mixer or the output signal from the first mixer.

FIG. 1 is a block diagram showing a first embodiment of a quadrature mixer in a zero-IF signal selection and amplification unit in the receiving system of the first embodiment. Shown in FIG. 1 are an antenna input terminal 1, a band pass filter (BPF) 2, a low noise amplifier (LNA) 3, quadrature mixers 4I and 4Q, low pass filters (LPF) 5I and 5Q, amplifiers 6I and 6Q, a 90-degree phase-shifting circuit 7, a local oscillator 8, output terminals 9I1, 9I2, 9Q1 and 9Q2, and an in-phase signal component averaging circuit 20. Each of the blocks 2, 3, 4I, 4Q, 5I, 5Q, 6I, and 6Q has a differential configuration and the reference numerals with subscripts o and oB of 2o, 2oB, 3o, 3oB, 4Io, 4IoB, 4Qo, 4QoB, 5Io, 5IoB, 5Qo, 5QoB, 6Io, 6IoB, 6Qo, and 6QoB denote output signals from terminals. Each of the terminals outputs output signals whose phases are different from each other by 180 degrees.

A wireless communication signal input from the antenna input terminal 1 is supplied to the BPF 2 where signals in bands other than a desired band are suppressed, and the resultant signal is input as a balanced signal to the LNA 3. The LNA 3 amplifies an output signal of the BPF 2 so as not to degrade the signal-to-noise ratio (SNR) as much as possible. An output signal of the LNA 3 is equally divided into two signals and the signals are input to the quadrature mixers 4I and 4Q. An output signal of the local oscillator 8 is subjected to 90-degree phase shifting by the 90-degree phase shifting circuit 7 and the resultant is input as a local oscillation signal to the quadrature mixer 4I. To the quadrature mixer 4Q, an output signal of the local oscillator 8 is input as a local oscillation signal without being subjected to phase shifting. At this time, the frequency of an output signal of the local oscillator 8 coincides with the center frequency of a signal of a desired channel of a wireless communication signal input from the antenna input terminal 1.

Therefore, an output signal of the quadrature mixer 4I becomes an I component of a signal in a desired band of the wireless communication signal input from the antenna input terminal 1, and an output signal of the quadrature mixer 4Q becomes a Q component of a signal in a desired band of the wireless communication signal input from the antenna input terminal 1. Output signals of the quadrature mixers 4I and 4Q are called normal-band signals in the zero-IF method. The output signal o from each of the blocks having the differential configuration includes an opposite phase component having a phase different from that of the output signal oB by 180 degrees and also the in-phase signal component having the same phase. Therefore, when the in-phase signal components of the output signals o and oB are not the same, an offset occurs. When the offset is large and exceeds a dynamic range of a block in a post stage, the opposite phase signal components between the output signals o and oB as desired signal components cannot be processed.

Figure 6:
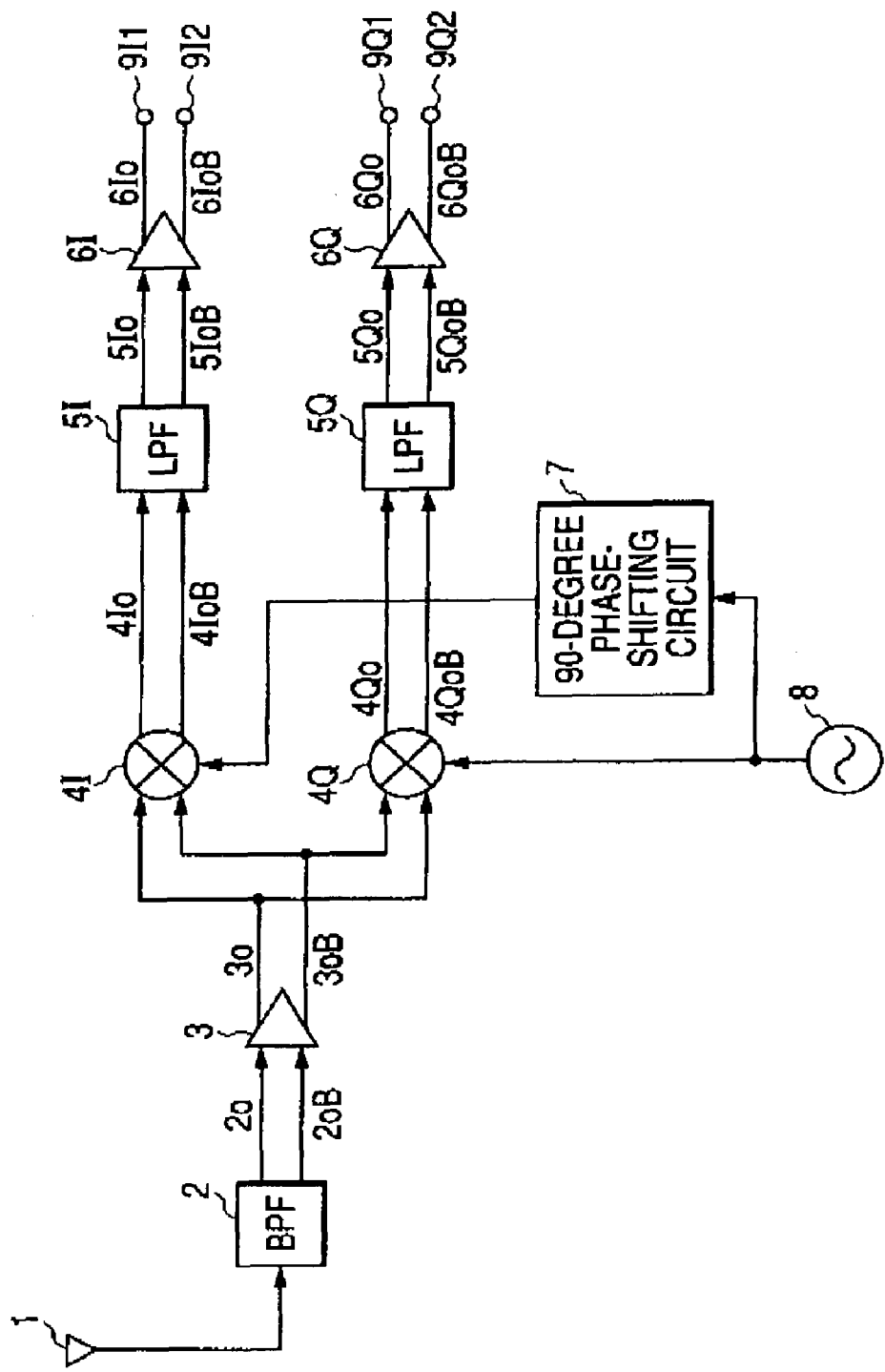
FIG. 6 is a block diagram illustrating an example of a receiving system.
Figure 7:
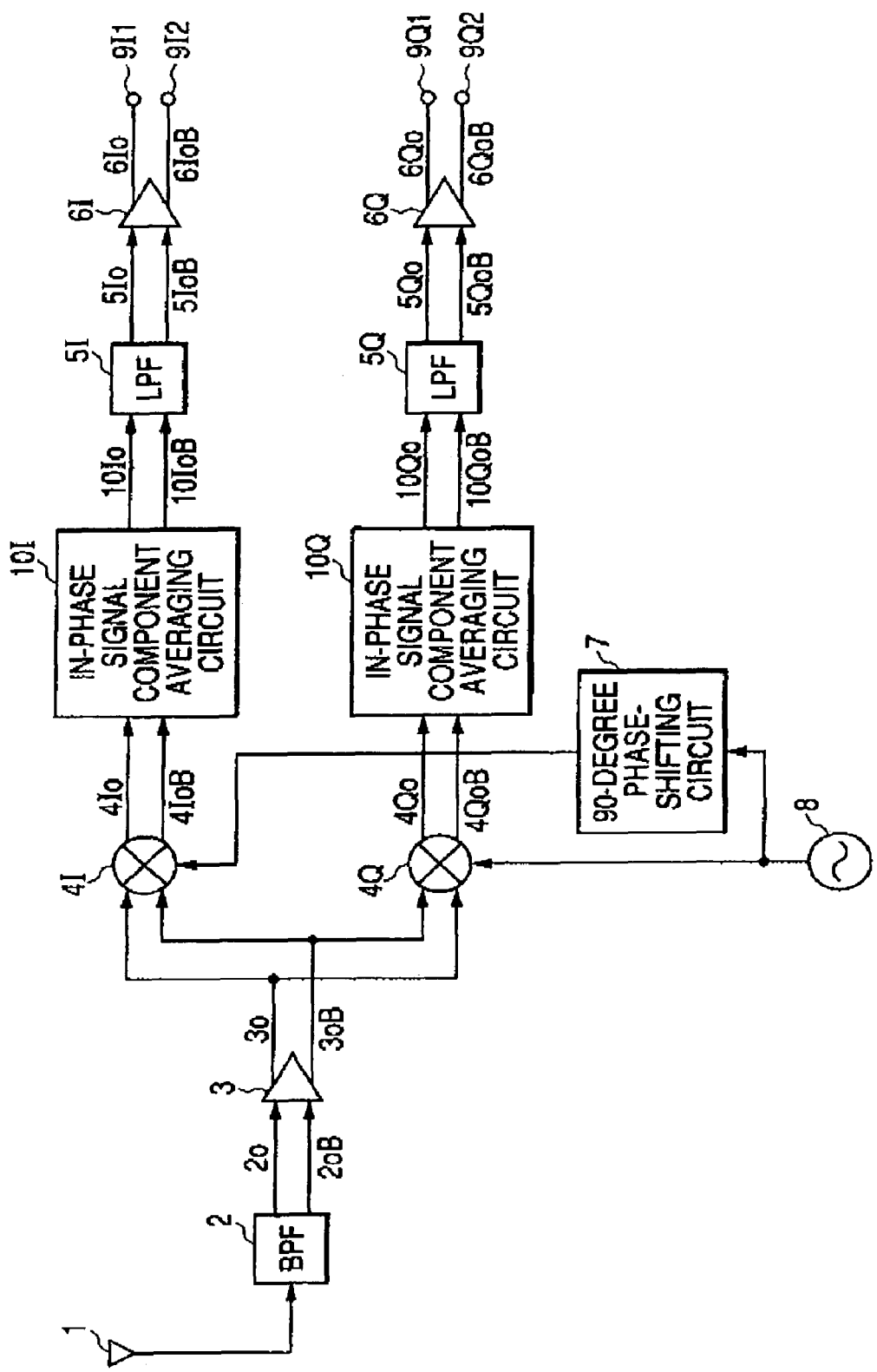
FIG. 7 is a block diagram of a receiving system having in-phase signal averaging means examined prior to the invention.
Figure 8:
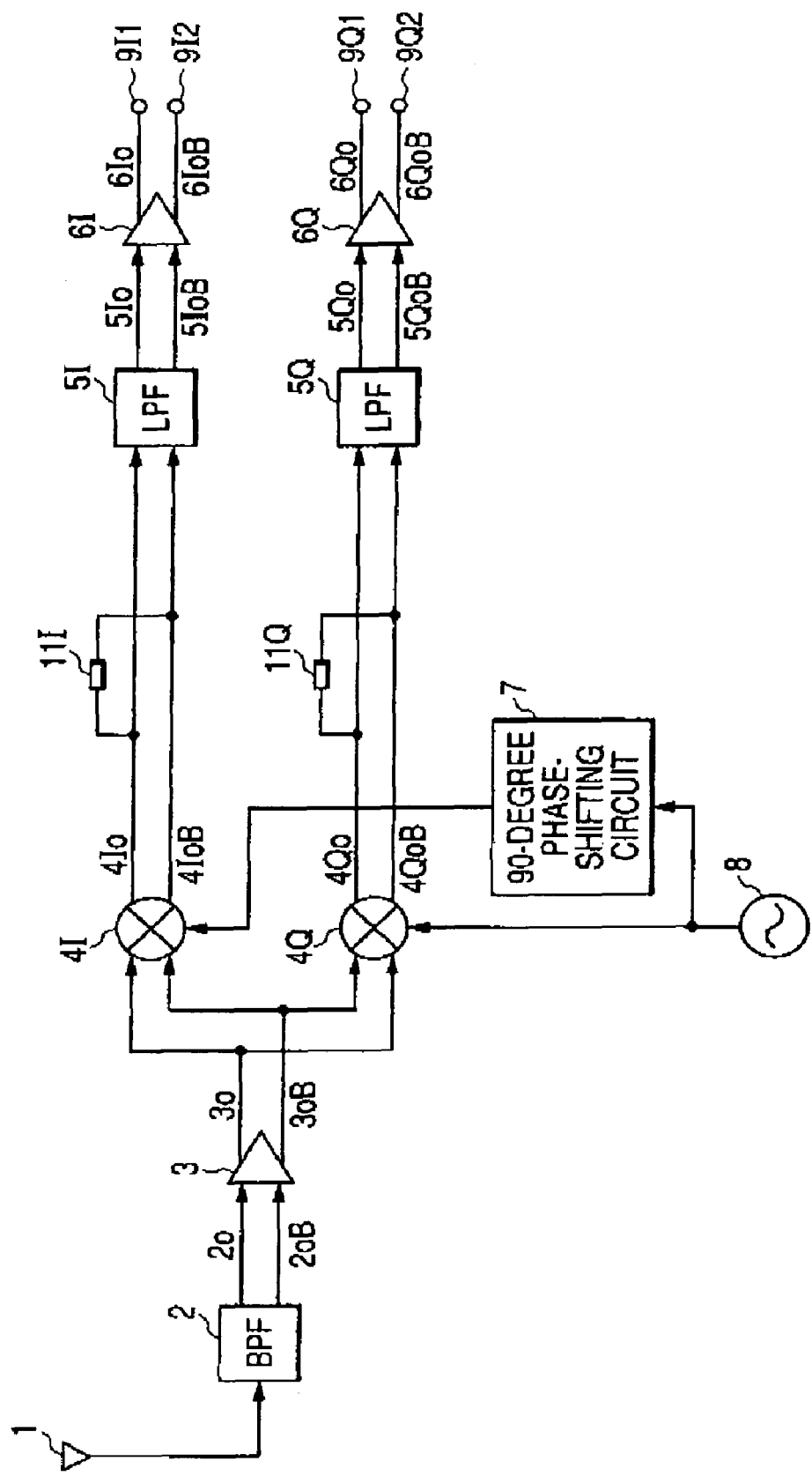
FIG. 8 is a block diagram showing an example of the in-phase signal averaging means examined.

To reduce the offset, in-phase signal components of only the output signals o and oB are averaged as described with reference to FIGS. 6 to 8. In the receiving system of the embodiment, as shown in FIG. 1, the in-phase signal components of four output signals of output signals 4Io and 4IoB of the quadrature mixer 4I and output signals 4Qo and 4QoB of the quadrature mixer 4Q are averaged by the in-phase signal component averaging circuit 20.

Outputs of the in-phase signal component averaging circuit 20 are input to the LPFs 5I and 5Q to suppress the bands except for the band of the desired channel signal. Output signals of the LPFs 5I and 5Q are amplified to a desired level by the amplifiers 6I and 6Q, and the amplified signals are output from the output terminals 9I1, 9I2, 9Q1 and 9Q2.

FIG. 2 shows a first configuration example of the in-phase signal component averaging circuit 20. In FIG. 2, the same reference numerals as those in FIG. 1 are given to components performing operations similar to those in FIG. 1. 21I1, 21I2, 21Q1 and 21Q2 denote passive elements and 24 denotes a bridging line. 21I1, 21I2, 21Q1, 21Q2 have an equal impedance. A connection point between the passive elements 21I1 and 21I2 and a connection point between the passive elements 21Q1 and 21Q2 are connected to each other via a bridging line 24. The passive elements 21I1, 21I2, 21Q1, and 21Q2 are, concretely, resistive elements and/or capacitive elements which are connected in parallel.

In-phase signal components of output signals 4Io, 4IoB, 4Qo, and 4QoB of the quadrature mixer 4I are set as 4IoC, 4IoBC, 4QoC, and 4QoBC, respectively. For example, the relation of 4IoC=4IoBC=4QoC>4QoBC is satisfied. An offset of the quadrature mixer 4I satisfies the specification and an offset of the quadrature mixer 4Q does not satisfy the specification. In this case, the wireless communication signal receiving circuit of FIG. 8 does not satisfy the specification and is therefore defective. In FIG. 2 of the embodiment, correction current from the in-phase signal components 4IoC, 4IoBC, and 4QoC is added to the component 4QoBC. Therefore, while the offset of the quadrature mixer 4I satisfies the specification, an offset of the quadrature mixer 4Q is reduced, and the circuit can be made non-defective.

FIG. 3 shows a second configuration example of the in-phase signal component averaging circuit 20. In FIG. 3, the same reference numerals as those in FIGS. 1 and 2 are given to components performing operations similar to those in FIGS. 1 and 2 and their description will not be repeated here. In FIG. 3, 22I and 22Q denote passive elements. The passive elements 22I and 22Q have equal impedances. By the passive elements 22I and 22Q, both of the in-phase and opposite-phase components in signal components other than the desired channel band of the output signals 4Io, 4IoB, 4Qo, and 4QoB are suppressed and a process of averaging the in-phase components of the output signals 4Io and 4IoB of the quadrature mixer 4I and a process of averaging the in-phase components of the output signals 4Qo and 4QoB of the quadrature mixer 4Q are also performed as shown in FIG. 8. Simultaneously, the process of averaging the in-phase signal components of the output signals 4Io, 4IoB, 4Qo, and 4QoB is performed as shown in FIG. 2, thereby further reducing the offset. The passive elements 21I1, 21I2, 21Q1, 21Q2, 22I, and 22Q are concretely resistive elements and/or capacitive elements which are connected in parallel. In the case of using capacitive elements as the passive elements 22I and 22Q, the capacitance value is relatively large, so that it is desirable to use an external capacitive element or an on-chip capacitive element and an external capacitive element which are connected in parallel.

FIG. 4 shows a configuration example using bipolar transistors in the quadrature mixers 4I and 4Q in FIG. 3. The same reference numerals as those in FIGS. 1 to 3 are given to components performing operations similar to those in FIGS. 1 to 3 and their description will not be repeated. Shown in FIG. 4 are passive elements 23I1, 23I2, 23Q1 and 23Q2, the bridging line 24, bipolar transistors 30I1 to 30I4, 30Q1 to 30Q4, 31I1, 31I2, 31Q1, and 31Q2, passive elements 41I and 41Q, passive elements 42I1, 42I2, 42Q1, and 42Q2, unbalanced-to-balanced transformers 50I and 50Q, and a power source 60.

The passive elements 23I1 and 23I2 and the passive elements 23Q1 and 23Q2 have equal impedances. The bipolar transistors 30I1 to 30I4 and 30Q1 to 30Q4 have equal characteristics. The bipolar transistors 31I1, 31I2, 31Q1, and 31Q2 have equal characteristics. The passive elements 41I and 41Q have equal impedances. The passive elements 42I1, 42I2, 42Q1, and 42Q2 have equal impedances.

An output signal of the local oscillator 8 is subjected to 90-degree phase shifting by the 90-degree phase-shifting circuit 7, the resultant signal is converted to a balanced signal by the unbalanced-to-balanced transformer 50I, and the balanced signal is input as a local oscillation signal of the quadrature mixer 4I. An output signal of the local oscillator 8 is not subjected to phase shifting but is converted to a balanced signal by the unbalanced-to-balanced transformer 50Q, and the balanced signal is input as a local oscillation signal to the quadrature mixer 4Q. Output signals 3o and 3oB of the LNA 3 shown in FIGS. 1 to 3 are branched and input to the bipolar transistors 31I1, 31I2, 31Q1 and 31Q2. The passive elements 41I, 41Q, 42I1, 42I2, 42Q1 and 42Q2 function as negative feedback circuits of the quadrature mixers 4I and 4Q to improve linearity.

The collector current of the bipolar transistors 31I1, 31I2, 31Q1 and 31Q2 is passed to the emitters of the bipolar transistors 30I1 to 30I4 and 30Q1 to 30Q4 and mixed with the local oscillation signal. The collector current passed to the emitters of the bipolar transistors 30I1 to 30I4 and 30Q1 to 30Q4 is converted to a signal voltage by the passive elements 23I1, 23I2, 23Q1 and 23Q2 acting as loads. As described with reference to FIG. 3, the passive elements 22I and 22Q suppress both of the in-phase and negative-phase components in signal components other than the desired channel band and perform a process of averaging the in-phase components of the output signals 4Io and 4IoB of the quadrature mixer 4I and a process of averaging the in-phase components of the output signals 4Qo and 4QoB of the quadrature mixer 4Q. As described with reference to FIG. 2, the passive elements 21I1, 21I2, 21Q1, and 21Q2 perform a process of averaging the in-phase signal components of the output signals 4Io, 4IoB, 4Qo, and 4QoB of the quadrature mixers 4I and 4Q. The passive elements 23I1, 23I2, 23Q1, and 23Q2 take the form of resistive elements.

The frequency of an output signal of the local oscillator 8 coincides with the center frequency of a desired channel signal in a wireless communication signal input from the antenna input terminal 1. Therefore, the output signal of the quadrature mixer 4I becomes an I component of a signal in a desired band of the wireless communication signal input from the antenna input terminal 1, and an output signal of the quadrature mixer 4Q becomes a Q component of a signal in a desired band of the wireless communication signal input from the antenna input terminal 1. Output signals of the quadrature mixers 4I and 4Q are called normal-band signals in the zero-IF method.

A second embodiment of the receiving system of the invention will now be described with reference to FIG. 5.

The receiving system of the second embodiment has a configuration that an offset of the quadrature mixers 4I and 4Q in the low-IF signal selection and amplification unit is suppressed in multiple stages. In FIG. 5, the same reference numerals as those in FIGS. 1 to 3 are given to components performing operations similar to those in FIGS. 1 to 3 and their description will not be repeated. In FIG. 5, 100 and 101 denote in-phase signal component averaging circuits. As shown in FIG. 5, by providing the in-phase signal component averaging circuits 100 and 101 also at a post stage of the amplifiers 6I and 6Q of the LPFs 5I and 5Q, and increasing impedances of the passive elements 21I1, 21I2, 21Q1, 21Q2, 22I and 22Q shown in FIGS. 2 and 3, the gain of a negative phase component in the desired channel band is increased, the SNR is improved, and an offset can be suppressed.

The receiving system of each of FIGS. 1 to 5 is called a low-IF receiving system, which uses, as the local oscillator 8, a local oscillator for outputting a signal which oscillates at a frequency apart from the center frequency of the desired channel band of the input signal of the quadrature mixers 4I and 4Q in the receiving systems of FIGS. 1 to 5 by ½ of the desired channel bandwidth or more, and has a 90-degree phase shifting circuit at the post stage of the amplifier 6Q, and an adding circuit for adding an output signal of the 90-degree phase-shifting circuit and an output signal of the amplifier 6I. By providing the receiving system with one or more of in-phase signal component averaging circuits 20, 100, and 101 at the post stages of the quadrature mixers 4I, 4Q, LPFs 5I and 5Q, and amplifiers 6I and 6Q, respectively, an offset can be decreased and the manufacturing yield can be improved.

The receiving system of the second embodiment has a low-IF signal selection and amplification unit including: an antenna input filter for passing only a desired band in a signal from an antenna input terminal; an antenna input amplifier for amplifying an output signal of the antenna input filter and outputting the amplified signal; a dividing circuit for dividing an output signal of the antenna input amplifier into two signals; a local oscillator for outputting a signal which oscillates at a center frequency of a desired channel band in an output signal of the antenna input filter by ½ of the desired channel bandwidth or more; a first 90-degree phase-shifting circuit for shifting a phase of an output signal of the local oscillator by 90 degrees and outputting a resultant signal; a first mixer for mixing a first output signal of the dividing circuit with the output signal of the first 90-degree phase-shifting circuit; a second mixer for mixing a second output signal of the dividing circuit with the output signal of the local oscillator; a first mixer filter connected to the first mixer and for passing only a desired channel band of an input signal; a second mixer filter connected to the second mixer and for passing only a desired channel band of the input signal; a first filter output amplifier connected to the first mixer filter and for amplifying an input signal and outputting the amplified signal; a second filter output amplifier connected to the second mixer filter and for amplifying an input signal and outputting the amplified signal; a second 90-degree phase-shifting circuit for shifting a phase of an output signal of the second filter output amplifier by 90 degrees; and an adder for adding an output signal of the first filter output amplifier to an output signal of the second 90-degree phase-shifting circuit. The low-IF signal selection and amplification unit can adjust an output signal from the first mixer by an in-phase signal component of the output signal from the second mixer and can adjust an output signal from the second mixer by an in-phase signal component of the output signal from the first mixer.

When an input signal from the antenna is an analog signal, an output signal from the signal selection and amplification unit of the receiving system of the invention is, for example, A/D converted and subjected to a digital process.

As described in the foregoing embodiment, according to the invention, also in the case where an offset of an output signal of the first mixer satisfies the specification and an offset of an output signal of the second mixer does not satisfy the signal or vise versa, the probability that the specifications are satisfied increases, and the manufacturing yield can be improved.

By concurrently performing the process of averaging the in-phase signal components in an output signal of the first filter and an output signal of the second filter and the process of averaging the in-phase signal components in an output signal of the first amplifier and an output signal of the second amplifier, the manufacturing yield can be further improved.

Figure 9:
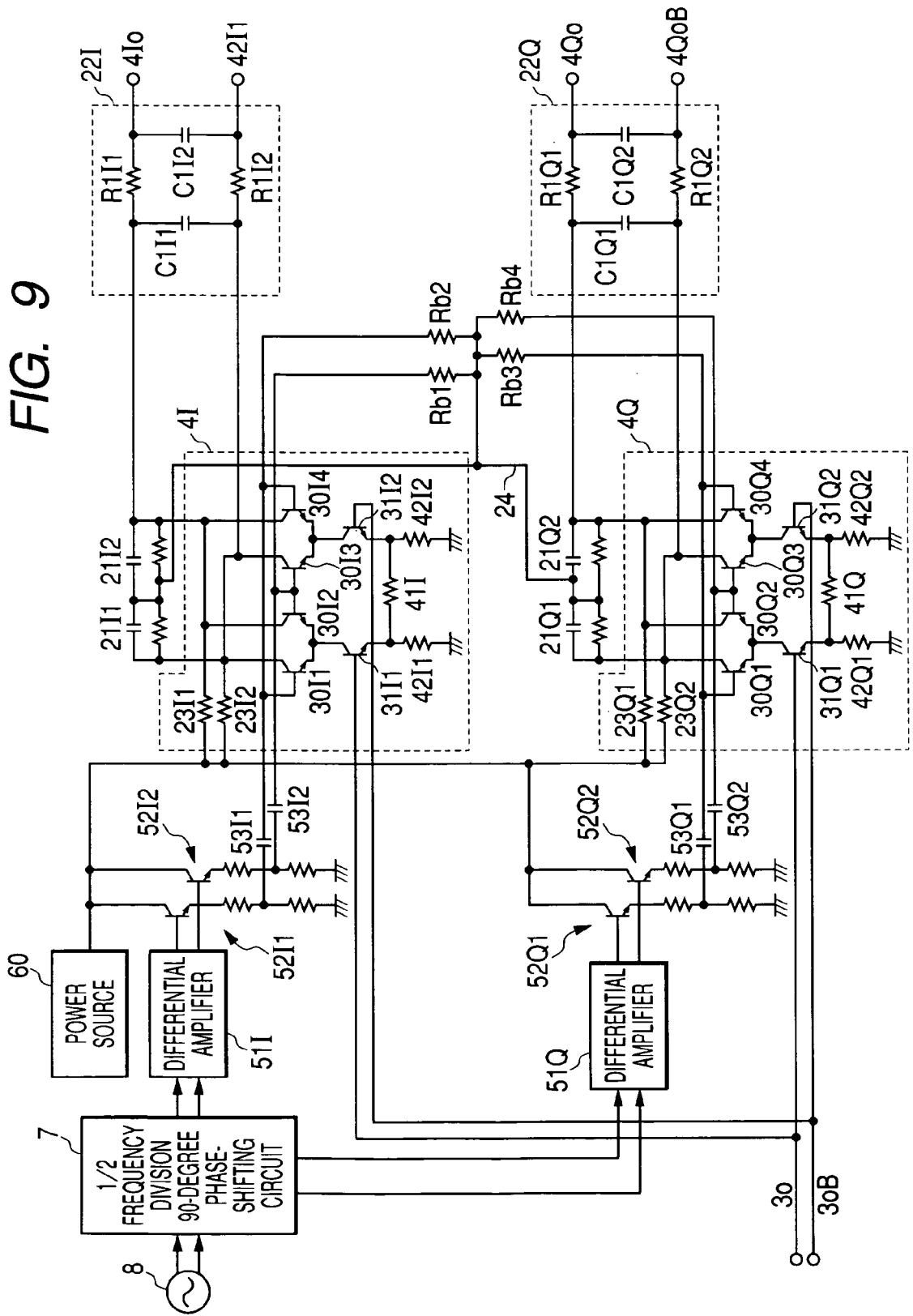
FIG. 9 is a circuit diagram showing an example of the case of applying the invention to a receiving system capable of receiving a signal of the WCDMA system.

FIG. 9 shows an embodiment of the case where the invention is applied to a receiving system capable of receiving a WCDMA signal. Although not particularly limited, in the embodiment, the local oscillator 8 is constructed to output an oscillation signal as differential signals. The local oscillator 8 oscillates at a frequency twice as high as the reception frequency, and the 90-degree phase shifting circuit 7 divides the frequency of an oscillation signal from the local oscillator 8 and can generate signals of which phases are shifted from each other by 90 degrees.

Further, in the embodiment, the local oscillator 8 is constructed to output differential oscillation signals, so that the unbalanced-to-balanced transformers 50I and 50Q are not provided between the 90-degree phase-shifting circuit 7 and the mixers 4I and 4Q. Instead, differential amplifiers 51I and 51Q for amplifying a signal generated by the 90-degree phase-shifting circuit 7 and emitter followers 52I1, 52I2, 52Q1, and 52Q2 for impedance conversion are provided. Output signals of the emitter followers 52I1, 52I2, 52Q1, and 52Q2 are input to the mixers 4I and 4Q via capacitors 53I1, 53I2, 53Q1, and 53Q2 for blocking a DC component.

In the embodiment, circuits having the configuration similar to those shown in FIG. 4 are used as the mixers 4I and 4Q. As the passive elements 21I1, 21I2, 21Q1, and 21Q2 constructing the in-phase signal component averaging circuit integrated in the mixers 4I and 4Q, resistors and capacitors which are connected in parallel are used. An intermediate node of series resistors and an intermediate node of series capacitors constructing each of the in-phase signal component averaging circuits are coupled to each other. Further, an intermediate node of the in-phase signal component averaging circuit of the mixer 4I and an intermediate node of the in-phase signal component averaging circuit of the mixer 4Q are coupled to each other via the bridging line 24.

Further, a component corresponding to the passive element 22I as a component of the in-phase signal component averaging circuit of the mixer 4I shown in FIG. 4 is constructed by capacitors C1I1 and C1I2 connected between output terminals of the mixer 4I and resistors R1I1 and R1I2 between the capacitors C1I1 and C1I2 in the embodiment. A component corresponding to the passive element 22Q in the mixer 4Q in FIG. 4 is constructed by capacitors C1Q1 and C1Q2 connected between output terminals of the mixer 4Q and resistors R1Q1 and R1Q2 between the capacitors C1Q1 and C1Q2 in the embodiment. C1I1 and C1Q1 have capacitance values such as 15 pF, the capacitors C1I2 and C1Q2 have capacitance values such as 80 pF, and the resistors R1I1, R1I2, R1Q1, and R1Q2 have resistance values such as 100 Ω.

With such a configuration, an offset between the in-phase signal components included in output signals of the mixers 4I and 4Q can be decreased. The resistance values of the passive elements 21I1, 21I2, 21Q1, and 21Q2 constructing the in-phase signal component averaging circuits 21I and 21Q are equal to each other and are five times or more as large as the resistance values of load resistors 23I1, 23I2, 23Q1, and 23Q2 of the mixers 4I and 4Q. If the values of resistors as components of the in-phase signal component averaging circuits 21I and 21Q are lower than the resistance values of the load resistors 23I1 to 23Q2, a desired output amplitude cannot be obtained.

Further, in the embodiment, by coupling the base terminals of the upper-stage differential transistors 30I1 to 30Q4 as components of the mixers 4I and 4Q via resistors Rb1 to Rb4, a direct current voltage obtained by averaging four input signals is applied as a bias voltage to the base terminals of the transistors 30I1 to 30Q4 to perform self-bias, thereby reducing power consumption. By coupling the common connection nodes of the resistors Rb1 to Rb4 and the bridging line 24, a bias voltage generated by the resistors Rb1 to Rb4 is applied to an intermediate node of the in-phase signal component averaging circuits 21I and 21Q coupled to each other via the bridging line 24 to stabilize the potential of the intermediate node of the in-phase signal component averaging circuits 21I and 21Q. The resistors Rb1 to Rb4 have, for example, resistance values such as 8 kΩ.

Figure 10:
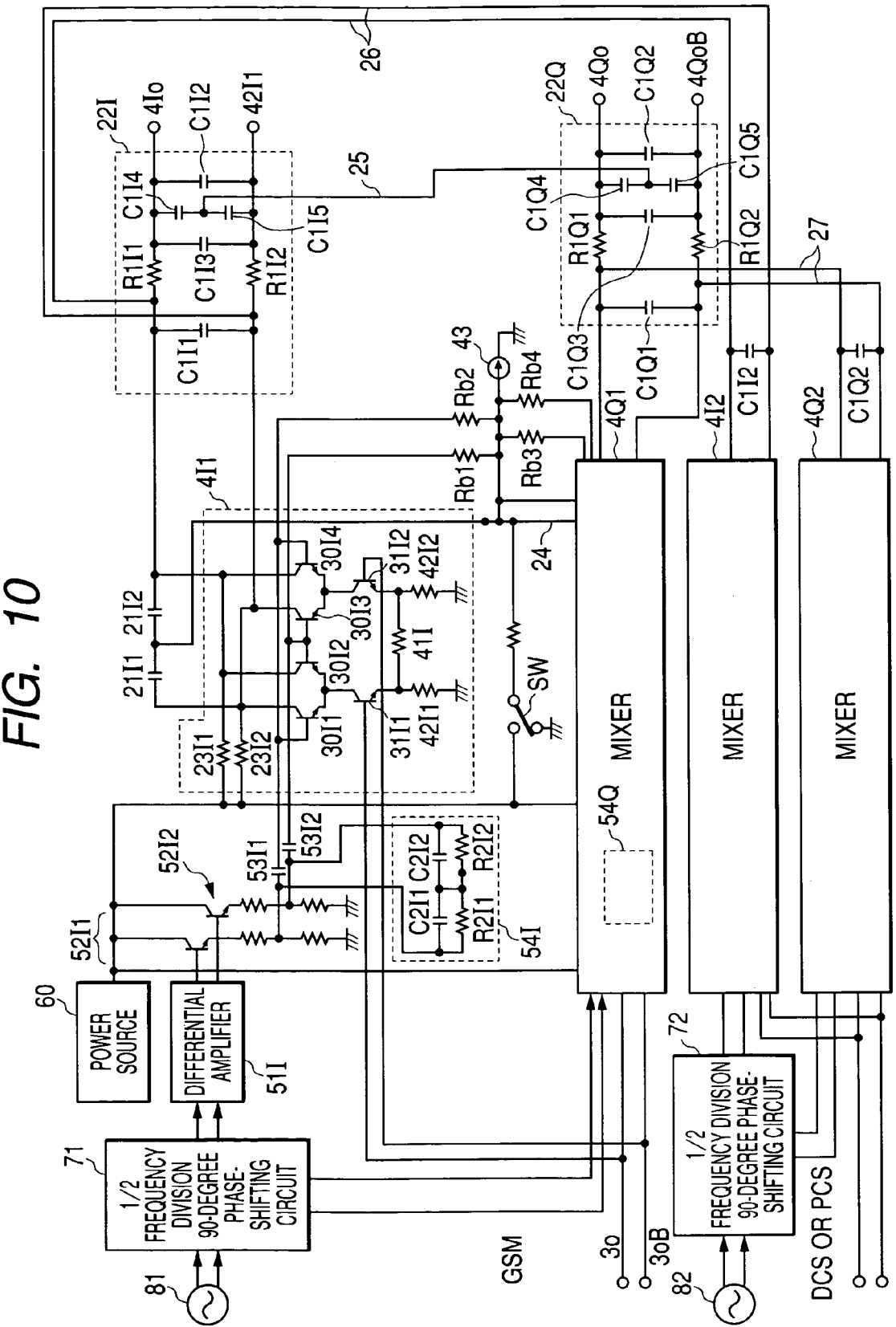
FIG. 10 is a circuit diagram showing an example of the case of applying the invention to a receiving system capable of receiving signals of a plurality of bands such as GSM, DCS, and PCS.

FIG. 10 shows an embodiment of the case of applying the invention to a receiving system capable of receiving signals of a plurality of bands such as GSM, DCS, and PCS. In the embodiment, in addition to a local oscillator 81 for GSM, a 90-degree phase shifting circuit 71, and the mixers 4I1 and 4Q1, a local oscillator 82 for DCS/PCS, a 90-degree phase-shifting circuit 72, and the mixers 4I2 and 4Q2 are provided. Since the mixers 4I1 and 4Q1 for GSM and the mixers 4I2 and 4Q2 for DCS/PCS have similar configurations, the mixer 4I1 for GSM will be described hereinbelow, and the mixers 4Q1, 4I2, and 4Q2 will not be described. The local oscillators 81 and 82 oscillate at a frequency which is twice as high as the reception frequency, and the 90-degree phase-shifting circuits 71 and 72 divide the frequency of an oscillation signal to ½ and generate signals of phases shifted from each other by 90 degrees.

Also in the embodiment, the local oscillator 8 outputs the oscillation signal as differential signals. Between the 90-degree phase shifting circuit 71 and the mixers 4I1 and 4Q1, in place of the unbalanced-to-balanced transformers 50I and 50Q, the differential amplifiers 51I and 51Q (51Q is not shown) for amplifying a signal generated by the 90-degree phase-shifting circuit 71 and emitter followers 52I1 and 52I2 for impedance conversion are provided. In the embodiment, to decrease an offset in the in-phase signal components included in output signals I, IB, Q, and QB of the emitter followers, the in-phase signal component averaging circuits 54I and 54Q (54Q is not shown) are provided.

The in-phase signal component averaging circuit 54I is constructed by resistors R2I1 and R2I2 and capacitors C2I1 and C2I2 connected to the resistors R2I1 and R2I2 in parallel. Although not shown, the in-phase signal component averaging circuit 54Q in the mixer 4Q1 is similarly constructed.

In the embodiment, the mixers 4I1 and 4Q1 have configurations similar to those shown in FIG. 4. As the passive elements 21I1, 21I2, 21Q1, and 21Q2 as components of the in-phase signal component averaging circuits integrally assembled in the mixers 4I1 and 4Q1, capacitors are used. An intermediate node of capacitors as the passive elements 21I1 and 21I2 and an intermediate node of capacitors as the passive elements 21Q1 and 21Q2 (not shown in FIG. 10) are coupled to each other via the bridging line 24.

Further, a component corresponding to the passive element 22I as a component of the in-phase signal component averaging circuits 21I and 21Q shown in FIG. 4 is constructed by capacitors C1I1, C1I2, C1I3, C1I4, and C1I5 connected between output terminals of the mixer 4I1 and resistors R1I1 and R1I2 between the capacitors C1I1 and C1I2 in the embodiment. A component corresponding to the passive element 22Q is constructed by capacitors C1Q1, C1Q2, C1Q3, C1Q4, and C1Q5 connected between output terminals of the mixer 4Q1 and resistors R1Q1 and R1Q2 between the capacitors C1Q1 and C1Q2. The capacitors C1I1 and C1Q1 have capacitance values such as 5 pF, the capacitors C1I2 and C1Q2 have capacitance values such as 1000 pF, the capacitors C1I3 and C1Q3 have capacitance values such as 10 pF, the capacitors C1I4, C1I5, C1Q4, and C1Q5 have capacitance values such as 5 pF, and the resistors R1I1, R1I2, R1Q1, and R1Q2 have resistance values such as 75 Ω.

Since the capacitance values of the capacitors C1I2 and C1I2 are large and it is difficult to form them as devices on the chip, it is desirable to use external devices. The reason why the capacitors C1I3, C1I4, C1I5, C1Q3, C1Q4, and C1Q5 are provided in addition to the capacitors in the passive elements 22I and 22Q in the embodiment of FIG. 9 is that, when external devices are used as the capacitors C1I2 and C1Q2 and connected via bonding wires, the influence of the impedance component of the wires causes a new offset. As an in-phase signal component averaging circuit for decreasing the offset, the capacitors C1I3, C1I4, C1I5, C1Q3, C1Q4, and C1Q5 are provided. To reduce the offset caused by mismatch of the in-phase signal components included in the output signal of the mixer 4I1 and the output signal of the mixer 4Q1, the intermediate node of the capacitors C1I3 and C1I4 and the intermediate node of the capacitors C1Q3 and C1Q4 are coupled to each other via the bridging line 25.

In the embodiment, base terminals of the upper-stage differential transistors 30I1 to 30Q4 as components of the mixers 4I1 and 4Q1 are connected to each other via resistors Rb1 to Rb4 and a constant current source 43 is provided between the common connection node of the resistors Rb1 to Rb4 and the ground point, thereby applying a bias voltage to the base terminals of the differential transistors 30I1 to 30Q4 via the resistors Rb1 to Rb4. In the embodiment, the bias voltage is applied also to the intermediate node in the in-phase signal component averaging circuit 54I and the like, and the potential of each of the intermediate nodes is stabilized. Further, a change-over switch SW is provided between the common connection nodes of the resistors Rb1 to Rb4 and the ground point. By changing the switch SW to the ground potential side by a band selection signal, the mixer on the GSM side or the DCS/PCS side can be turned off.

In the embodiment, by connecting the output terminal of the mixer 4I2 for DSC/PCS to the output terminal of the mixer 4I1 for GSM via a line 26, the load resistors 23I1 and 23I2 of the mixer 4I1 are shared with the mixer 4I2. By connecting the output terminal of the mixer 4Q2 for DCS/PCS to the output terminal of the mixer 4Q1 for GSM via a line 27, the load resistor (not shown) of the mixer 4Q1 is shared with the mixer 4Q2.

Figure 11:
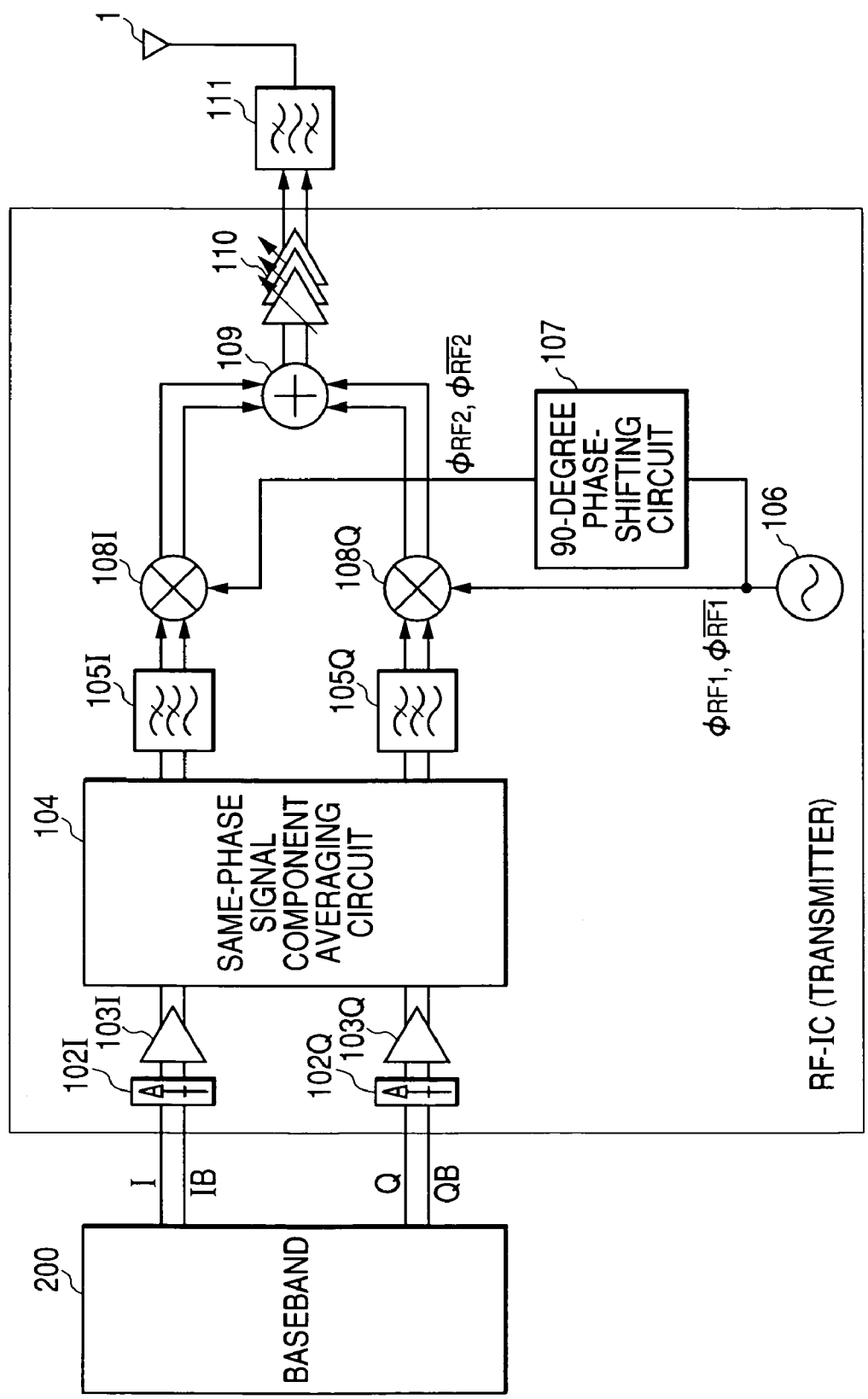
FIG. 11 is a block diagram showing a first embodiment of a transmitting system to which the invention is applied.

FIG. 11 shows a first embodiment of a transmitting system to which the invention is applied.

The transmitting system of the embodiment includes: attenuators 102I and 102Q for attenuating transmission I and Q signals supplied from a baseband IC 200; fixed gain amplifiers 103I and 103Q for amplifying the I and Q signals attenuated by the attenuators 102I and 102Q; an in-phase signal component averaging circuit 104 for averaging in-phase signal components of output signals I, IB, Q, and QB of the amplifiers 103I and 103Q and decreasing a DC offset; low-pass filters 105I and 105Q for eliminating harmonics from the output signals I, IB, Q, and QB of the amplifiers 103I and 103Q; a local oscillator 106 for generating a local oscillation signal of a predetermined frequency; a 90-degree phase-shifting circuit 107 for generating a signal obtained by shifting the phase of the oscillation signal generated by the local oscillator 106 by 90 degrees; mixers 108I and 108Q for mixing the I and Q signals passed through the low pass filters 105I and 105Q, the oscillation signal output from the local oscillator 106, and the signal of which phase is shifted by 90 degrees output from the 90-degree phase-shifting circuit 107, thereby converting the I and Q signals to signals of higher frequency and also performing quadrature modulation; an adder 109 for adding output signals of the mixers 108I and 108Q; a variable gain amplifier 110 for amplifying the signal obtained by the adding process; and a band pass filter 111 for eliminating unnecessary waves from the amplified signal.

The attenuators 102I and 102Q include a plurality of resistive elements and a change-over switch for switching the resistive elements and are constructed so as to be able to change the attenuation factor of the signal. The level of the transmission I and Q signals supplied from the baseband IC 200 varies according to a baseband IC used. By changing the attenuation factor of the attenuators 102I and 102Q in accordance with a baseband IC used, the levels of the I and Q signals input to the amplifiers 103I and 103Q can be made constant. The local oscillator 106 and the 90-degree phase-shifting circuit 107 are constructed so as to output differential signals.

Figure 12:
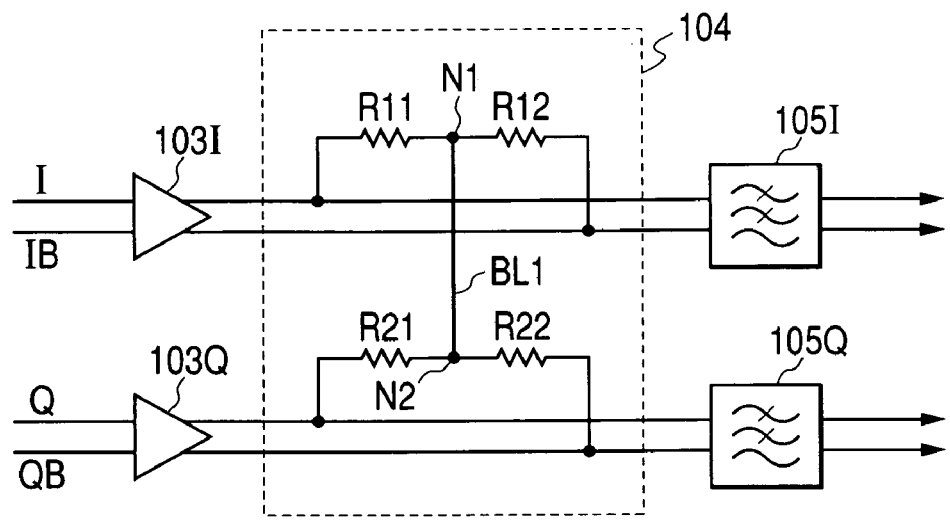
FIG. 12 is a circuit diagram showing a first concrete example of an in-phase signal component averaging circuit.

FIGS. 12 to 15 show concrete examples of the in-phase signal component averaging circuit 104. In FIG. 12, resistors R11 and R12 are connected in series between differential outputs of the amplifier 103I. Resistors R21 and R22 are connected in series between differential outputs of the amplifier 103Q. A connection node N1 of the resistors R11 and R12 and a connection node N2 of the resistors R21 and R22 are coupled to each other via a bridging line BL1. The resistors R11, R12, R21, and R22 have the same value. An offset in in-phase signal components between the differential outputs of the amplifier 103I is reduced by the series resistors R11 and R12, and an offset in in-phase signal components between the differential outputs of the amplifier 103Q is reduced by the series resistors R21 and R22. Further, an offset in in-phase signal components between an output of the amplifiers 103I and an output of the amplifier 103Q is reduced by coupling the connection nodes N1 and N2 to each other via the bridging line BL1.

Figure 13:
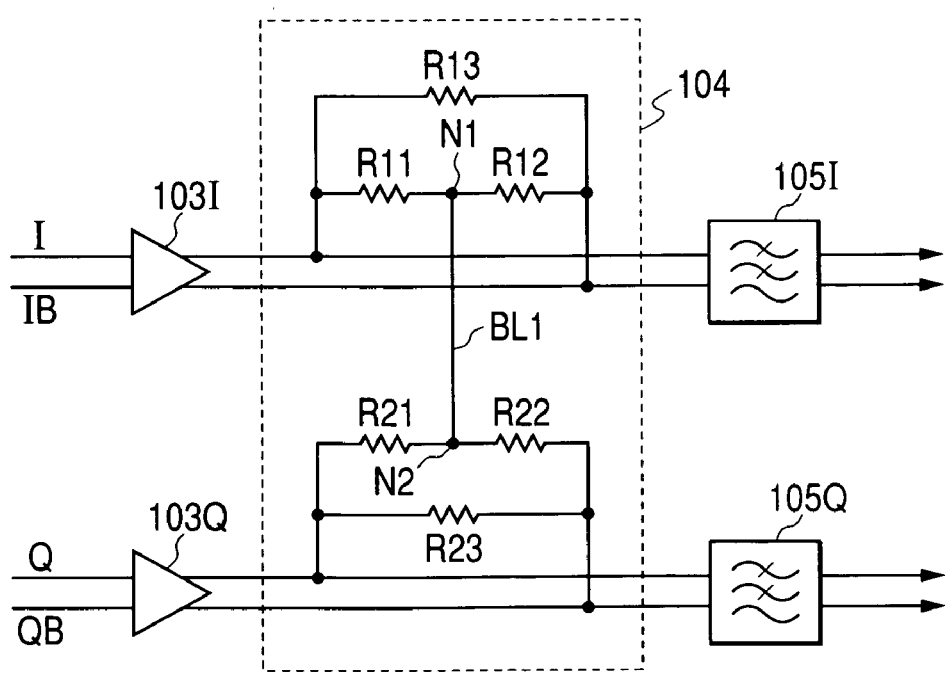
FIG. 13 is a circuit diagram showing a second concrete example of the in-phase signal component averaging circuit.

In the in-phase signal component averaging circuit 104 of FIG. 13, a resistor R13 is provided in parallel with the resistors R11 and R12 and a resistor R23 is provided in parallel with the resistors R21 and R22 in the in-phase signal component averaging circuit 104 in FIG. 12. In a manner similar to FIG. 12, the connection node N1 of the resistors R11 and R12 and the connection node N2 of the resistors R21 and R22 are coupled to each other via the bridging line BL1.

Figure 14:
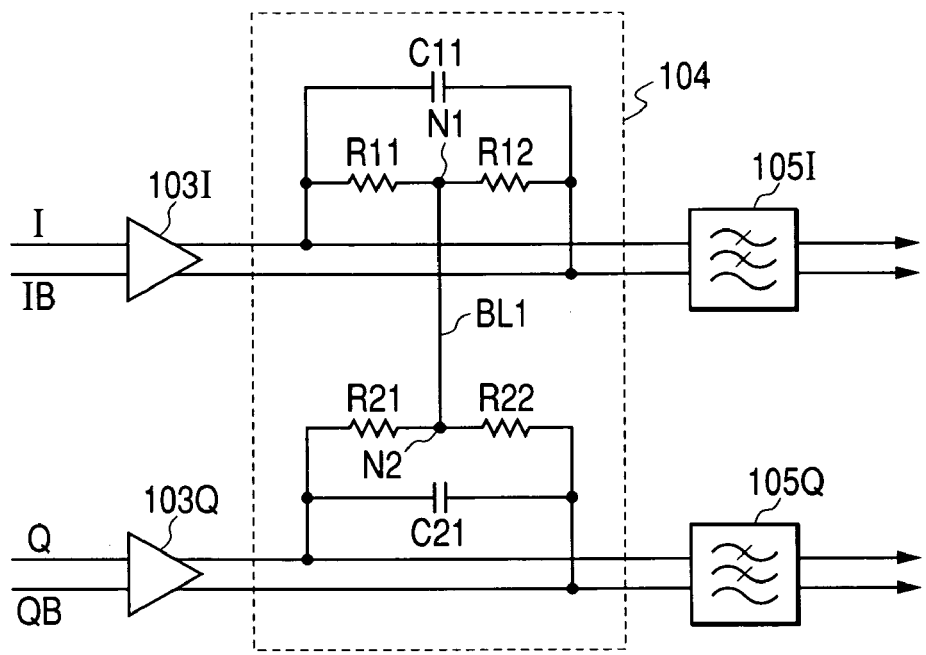
FIG. 14 is a circuit diagram showing a third concrete example of the in-phase signal component averaging circuit.

The in-phase signal component averaging circuit 104 in FIG. 14 has a capacitor C11 in place of the resistor R13 of the in-phase signal component averaging circuit 104 in FIG. 13 and has a capacitor C21 in place of the resistor R23. In a manner similar to FIG. 13, the connection node N1 of the resistors R11 and R12 and the connection node N2 of the resistors R21 and R22 are coupled to each other via the bridging line BL1.

Figure 15:
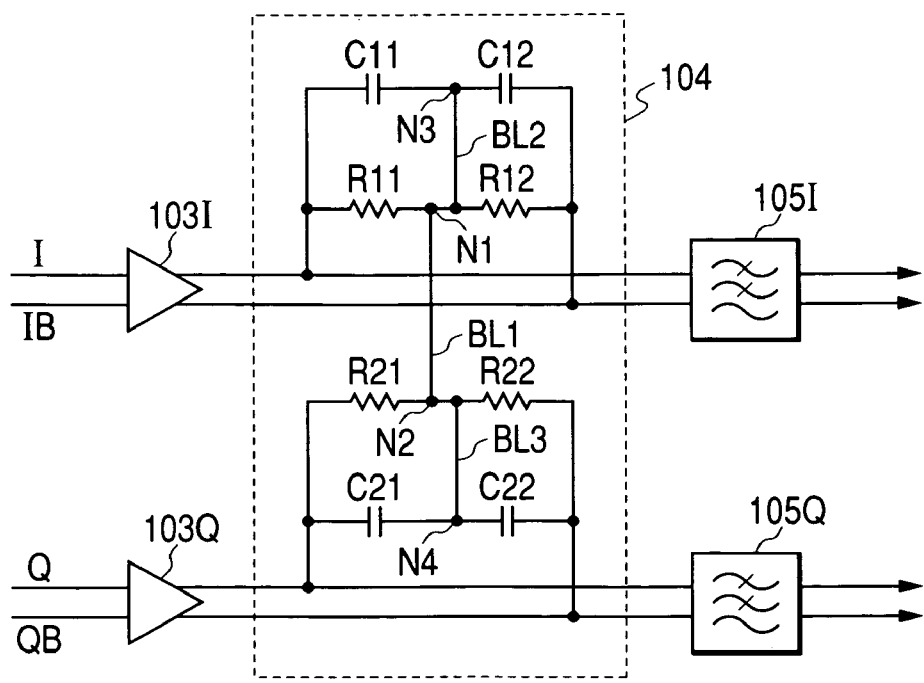
FIG. 15 is a circuit diagram showing a fourth concrete example of the in-phase signal component averaging circuit.

In the in-phase signal component averaging circuit 104 in FIG. 15, capacitors C11 and C12 are provided in parallel with the resistors R11 and R12 of the in-phase signal component averaging circuit 104 in FIG. 12 and capacitors C21 and C22 are provided in parallel with the resistors R21 and R22. In a manner similar to FIG. 12, the connection node N1 of the resistors R11 and R12 and the connection node N2 of the resistors R21 and R22 are coupled to each other via the bridging line BL1. The connection node N1 of the resistors R11 and R12 and a connection node N3 of the capacitors C11 and C12 are coupled to each other via a bridging line BL2. The connection node N2 of the resistors R21 and R22 and a connection node N4 of the capacitors C21 and C22 are coupled to each other via a bridging line BL3.

Figure 16:
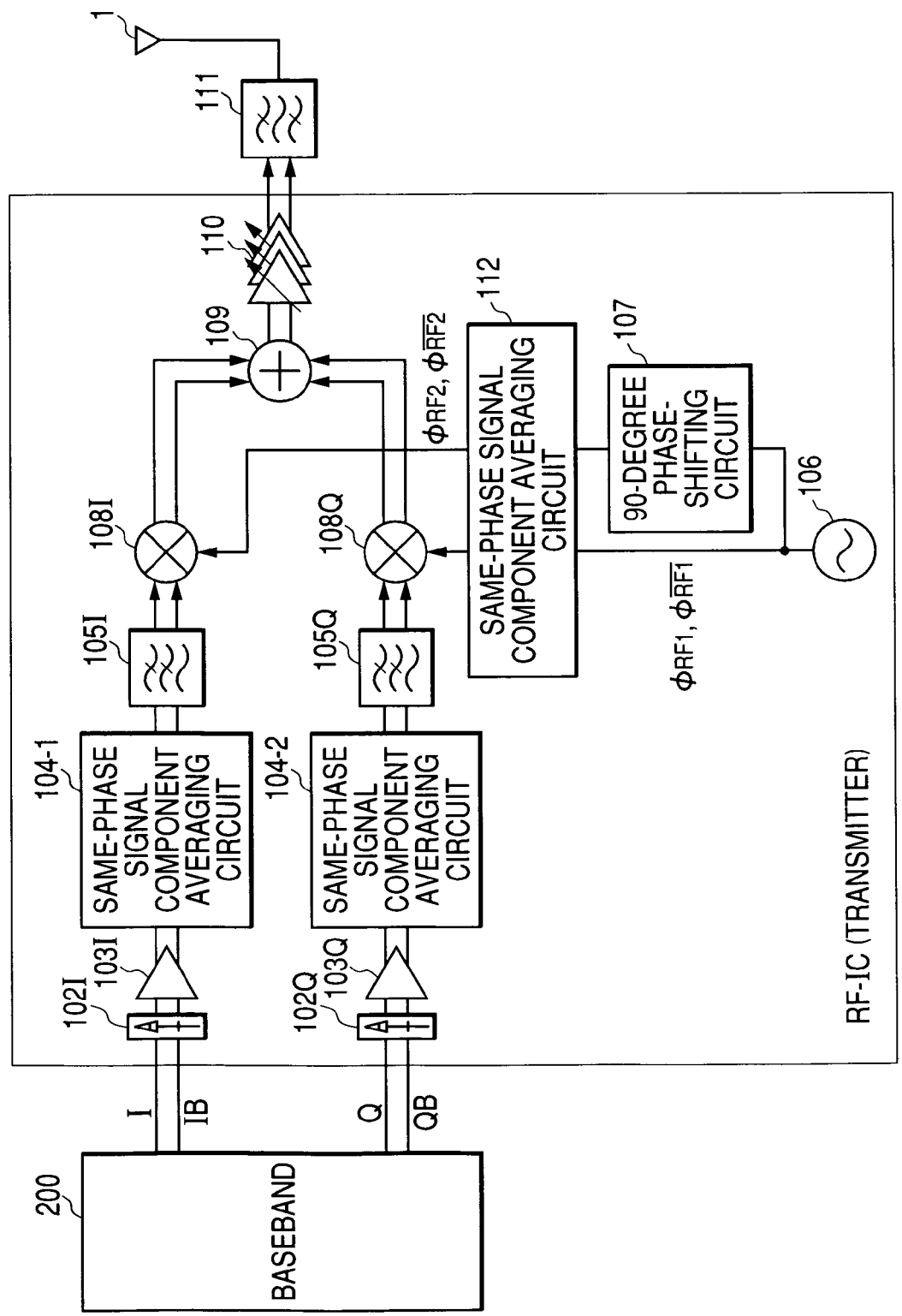
FIG. 16 is a block diagram showing a second embodiment of the transmitting system to which the invention is applied.

FIG. 16 shows a second embodiment of the transmitting system to which the invention is applied. In FIG. 16, the same reference numerals are designated to the same circuits as those shown in FIG. 11 and their description will not be repeated.

The transmitting system of the embodiment has a configuration similar to that of the transmitting system shown in FIG. 11. The difference from the transmitting system shown in FIG. 11 is that, in the second embodiment, in addition to the in-phase signal component averaging circuit 104 for averaging in-phase signal components of the output signals I, IB, Q, and QB of the amplifiers 103I and 103Q to decrease a DC offset, an in-phase signal component averaging circuit 112 for averaging in-phase signal components of output signals φRF1, /φRF1, φRF2, and /φRF2 of the local oscillator 106 and the 90-degree phase-shifting circuit 107 to decrease a DC offset is provided.

The in-phase signal component averaging circuit 112 can be provided between outputs of the differential amplifier 51I or emitter followers 52I1 and 51I2 as shown in FIG. 10. As the in-phase signal component averaging circuit 112, a circuit having the same configuration as any of the in-phase signal component averaging circuits 104 shown in FIGS. 12 to 15 can be used. The embodiment has an advantage such that an offset occurring among the output signals φRF1, /φRF1, φRF2, and /φRF2 due to variations in the characteristics of devices constructing the local oscillator 106 and the 90-degree phase-shifting circuit 107 can be reduced.

Figure 17:
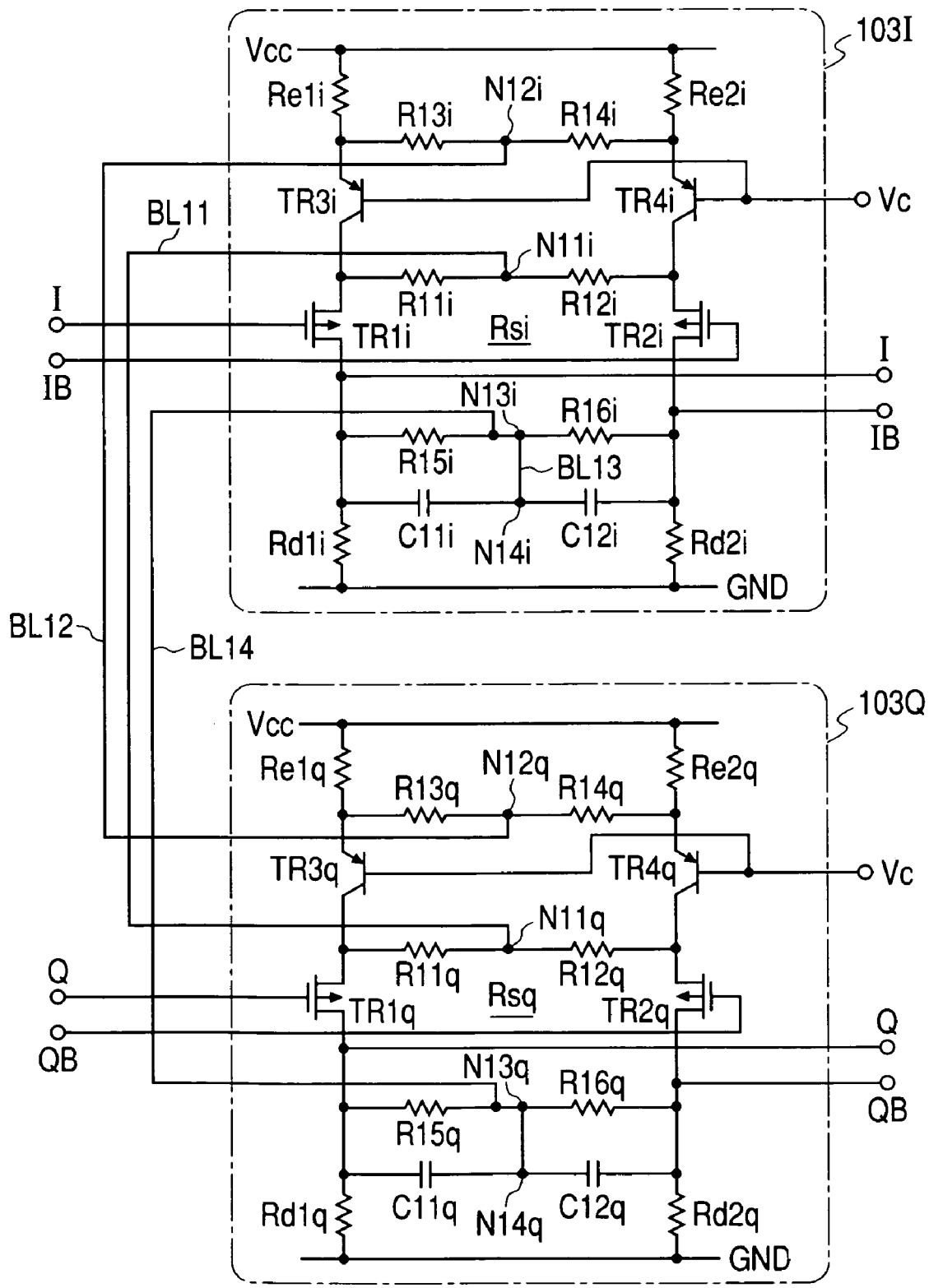
FIG. 17 is a block diagram showing a third embodiment of the transmitting system to which the invention is applied.

FIG. 17 shows a third embodiment of the transmitting system to which the invention is applied. In the transmitting system of the third embodiment, an in-phase signal component averaging circuit is integrally assembled in the amplifiers 103I and 103Q. Since the configurations of the amplifiers 103I and 103Q are the same, only the configuration of the amplifier 103I and the relation between the amplifiers 103I and 103Q will be described hereinbelow. The configuration of the amplifier 103Q will not be described.

The inherent amplifier 103I includes: input differential MOS transistors TR1$i$ and TR2$i$ to which signals I and IB to be amplified are input to gate terminals; bipolar transistors TR3$i$ and TR4$i$ for constant current and emitter resistors Re1$i$ and Re2$i$ connected between source terminals of the transistors TR1$i$ and TR2$i$ and a power source voltage terminal Vcc; a resistor Rsi connected between the source terminals of the input differential MOS transistors TR1$i$ and TR2$i$; and load resistors Rd1$i$ and Rd2$i$ connected between drain terminals of the input differential MOS transistors TR1$i$ and TR2$i$ and a ground point GND. A predetermined constant voltage Vc is applied to the base terminals of the bipolar transistors TR3$i$ and TR4$i$. The bipolar transistors TR3$i$ and TR4$i$ act as a constant current source and pass a constant current to the input differential MOS transistors TR1$i$ and TR2$i$. Consequently, the amplifier 103I amplifies the input signals I and IB with a gain determined by the ratio between the load resistors Rdd1$i$ and Rd2$i$ and the resistor Rsi and outputs the amplified signals.

In the amplifier 103I of the embodiment, the resistor Rsi between the source terminals of the input differential MOS transistors TR1$i$ and TR2$i$ is divided into two resistors R11$i$ and R12$i$, and a connection node N11$i$ of the resistors R11$i$ and R12$i$ in the amplifier 103I and a connection node N11$q$ of resistors R11$q$ and R12$q$ in the amplifier 103Q are coupled to each other via a bridging line BL11. Resistors R13$i$ and R14$i$ are connected between the emitters of the bipolar transistors TR3$i$ and TR4$i$, and a connection node N12$i$ of the resistors R13$i$ and R14$i$ in the amplifier 103I and a connection node N12$q$ of resistors R13$q$ and R14$q$ in the amplifier 103Q are connected to each other via a bridging line BL12.

Further, resistors R15$i$ and R16$i$ are connected in series between the drain terminals of the input differential MOS transistors TR1$i$ and TR2$i$. Capacitors C11$i$ and C12$i$ are connected in parallel with the resistors R15$i$ and R16$i$. A connection node N13$i$ of the resistors R15$i$ and R16$i$ and a connection node N14$i$ between the capacitors C11$i$ and C12$i$ are coupled to each other via a bridging line BL13. A connection node N13$i$ of the resistors R15$i$ and R16$i$ in the amplifier 103I and the connection node N14$q$ of resistors R15$q$ and R16$q$ in the amplifier 103Q are coupled to each other via a bridging line BL14.

The resistance values of the resistors R11$i$ to R16$i$ are the same. The resistance values of the resistors R11$i$ to R16$i$ are set to values larger than resistance values of the load resistors Rd1$i$ and Rd2$i$ (by two to five times). The resistance values of the resistors R11$q$ to R16$q$ and the load resistors Rd1$q$ and Rd2Q are similar to the above. If the resistance values of the resistors R11$i$ to R16$i$ are smaller than the resistance values of the load resistors Rd1$i$ and Rd2$i$, desired output amplification cannot be obtained. In place of the capacitors C11$i$ and C12$i$, one capacitor may be provided.

Although the invention achieved by the inventors herein has been described above concretely on the basis of the embodiments, obviously, the invention is not limited to the embodiments but can be variously modified without departing from the gist. For example, in the receiving system of the embodiment of FIG. 10, the two local oscillators 81 and 82 are provided in correspondence with two bands. It is also possible to share a local oscillator and supply a signal subjected to frequency division by ½ by a frequency divider to the 90-degree phase-shifting circuit 71 for GSM. In the transmitting system of the embodiment, the transmission I and Q signals from the baseband IC 200 are attenuated by the variable gain attenuators 102I and 102Q and amplified by the differential amplifiers 103I and 103Q using a fixed gain. Alternately, a variable gain differential amplifier may be provided in place of the attenuators and the differential amplifier using a fixed constant.

The case where the invention achieved by the inventors herein is applied to an IC for processing a wireless communication signal for use in a portable telephone in the field of utilization as the background of the invention has been mainly described above. However, the invention is not limited to the case but can be applied to an IC for processing a wireless communication signal for use in a wireless LAN and an IC for processing a wireless communication signal for performing frequency conversion and modulation/demodulation on a reception signal and a transmission signal.

What is claimed is:

1. A semiconductor integrated circuit device for processing a wireless communication signal having therein a receiving circuit, comprising:

a local oscillator for generating an oscillation signal of a desired frequency;

a 90-degree phase-shifting circuit for generating a signal obtained by shifting a phase of the oscillation signal output from the local oscillator by 90 degrees;

a first mixer for mixing one of differential reception signals with an output signal of said 90-degree phase-shifting circuit and outputting frequency-converted differential signals;

a second mixer for mixing another one of said differential reception signals with an output of said local oscillator and outputting frequency-converted differential signals;

an in-phase signal component averaging circuit having passive elements connected between the differential outputs of said first mixer, between differential outputs of said second mixer, and between an output of said first mixer and an output of said second mixer, and for reducing a DC offset created due to a difference between in-phase signal components included in output signals of said first and second mixers;

a first differential amplifier for amplifying the output signal of said local oscillator;

a second differential amplifier for amplifying the output signal of said 90-degree phase-shifting circuit; and a second in-phase signal component averaging circuit having passive elements connected between differential outputs of said first differential amplifier, between differential outputs of said second differential amplifier, and between an output of said first differential amplifier and an output of said second differential amplifier, and for reducing a DC offset created due to the difference between in-phase signal components included in output signals of said first and second mixers.

* * * * *